(12) United States Patent
Lee

(10) Patent No.: US 12,487,719 B2
(45) Date of Patent: Dec. 2, 2025

(54) TOUCH DISPLAY DEVICE

(71) Applicant: LG Display Co., Ltd., Seoul (KR)

(72) Inventor: HwiDeuk Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/914,636

(22) Filed: Oct. 14, 2024

(65) Prior Publication Data

US 2025/0173029 A1 May 29, 2025

(30) Foreign Application Priority Data

Nov. 23, 2023 (KR) ........................ 10-2023-0164317

(51) Int. Cl.
*G06F 3/044* (2006.01)
(52) U.S. Cl.
CPC ................................. *G06F 3/0446* (2019.05)
(58) Field of Classification Search
CPC ....... G06F 2203/04111; G06F 3/04164; G06F 3/0412; G06F 3/0446; G06F 3/0443
See application file for complete search history.

(56) References Cited

U.S. PATENT DOCUMENTS

| 11,740,720 B2 | 8/2023 | Park et al. |
| 2015/0185936 A1* | 7/2015 | Kim ..................... G06F 3/0412 345/174 |
| 2023/0094749 A1 | 3/2023 | Park et al. |
| 2023/0200180 A1 | 6/2023 | Park et al. |

FOREIGN PATENT DOCUMENTS

KR    10-2023-0046609 A    4/2023

OTHER PUBLICATIONS

European Patent Office, Extended European Search Report, European Patent Application No. 24210541.9, Apr. 10, 2025, nine pages.

\* cited by examiner

*Primary Examiner* — Deeprose Subedi
(74) *Attorney, Agent, or Firm* — Fenwick & West LLP

(57) ABSTRACT

A touch display device may include a first touch sensor disposed in a transparent area, a first touch line electrically connected to the first touch sensor and extending in a column direction, a first touch bridge electrically connected to the first touch line and extending in a row direction, and a first sub-touch bridge electrically connected to the first touch bridge and the first touch sensor, extending in the column direction, and not overlapping with the first touch sensor.

20 Claims, 25 Drawing Sheets

TOUCH DISPLAY DEVICE

CROSS REFERENCE TO RELATED APPLICATION

This application claims priority from Republic of Korea Patent Application No. 10-2023-0164317, filed on Nov. 23, 2023, which is hereby incorporated by reference in its entirety.

TECHNICAL FIELD

Embodiments of the present disclosure relate to a touch display device.

BACKGROUND

Recently, there is a touch display device which provides a touch-based input method allowing users to intuitively and conveniently input information or commands, evolving from conventional input methods such as a button, a keyboard, and a mouse.

In the case of a self-luminous display, if a touch sensor is built into a display panel, there may increase the parasitic capacitance due to the surrounding electrical patterns such as display-related electrodes or lines existing on the display panel, resulting in a problem of reduced touch sensitivity. In addition, there is a problem of reduced touch sensitivity due to changes in parasitic capacitance caused by an unknown phenomenon.

SUMMARY

Embodiments of the present disclosure may provide a touch display device having a touch bridge structure capable of preventing or at least reducing reduction in transmittance.

Embodiments of the present disclosure may provide a touch display device having a touch bridge structure capable of reducing a display-to-touch crosstalk (DTX).

Embodiments of the present disclosure may provide a touch display device having a touch sensor structure capable of reducing parasitic capacitance and load.

Embodiments of the present disclosure may provide a touch display device capable of eliminating a ghost touch.

Embodiments of the present disclosure may provide a touch display device having a temperature sensor structure combined with a touch sensor structure.

Embodiments of the present disclosure may provide a touch display device capable of compensating a touch sensing value by sensing a current reflecting temperature.

A touch display device according to embodiments of the present disclosure may include a first subpixel with a first light emitting device and a first scanning transistor, a first touch sensor adjacent to the first subpixel in a row direction, a first touch line electrically connected to the first touch sensor and extending in a column direction, a first sensing line disposed adjacent to the first touch line and extending in the column direction, a first sensing transistor controlling an electrical connection between the first sensing line and the first touch sensor, a first touch bridge electrically connected to the first touch line and extending in the row direction, and a first sub-touch bridge electrically connected to the first touch bridge and the first touch sensor, extending in the column direction, and disposed between the first subpixel and the first touch sensor.

In the touch display device according to embodiments of the present disclosure, the first sub-touch bridge may be disposed so as not to overlap with the first touch sensor.

A touch display device according to embodiments of the present disclosure may include a first touch sensor disposed in a transparent area, a first touch line electrically connected to the first touch sensor and extending in a column direction, a first touch bridge electrically connected to the first touch line and extending in a row direction, and a first sub-touch bridge electrically connected to the first touch bridge and the first touch sensor, extending in the column direction, and not overlapping with the first touch sensor.

A touch sensing method according to exemplary embodiments of the present disclosure may include a temperature sensing step for sensing a temperature of an area of a first touch sensor to obtain a temperature sensing value, or sense a current through the first touch sensor to obtain a current sensing value as the temperature sensing value during a display period; a touch sensing step for acquiring a first touch sensing value through the first touch sensor during a touch period; a temperature compensation step for creating a second touch sensing value by changing the first touch sensing value based on the temperature sensing value; and a touch occurrence or touch location determination step for determining the touch occurrence or touch location based on the second touch sensing value.

According to embodiments of the present disclosure, it is possible to provide a touch display device having a touch bridge structure capable of preventing reduction in transmittance.

According to embodiments of the present disclosure, it is possible to provide a touch display device having a touch bridge structure capable of reducing a display-to-touch crosstalk (DTX).

According to embodiments of the present disclosure, it is possible to provide a touch display device having a touch sensor structure capable of reducing parasitic capacitance and load.

According to embodiments of the present disclosure, it is possible to provide a touch display device capable of removing a ghost touch.

According to embodiments of the present disclosure, it is possible to provide a touch display device having a temperature sensor structure combined with a touch sensor structure.

According to embodiments of the present disclosure, it is possible to provide a touch display device capable of compensating a touch sensing value by sensing a current reflecting temperature.

According to embodiments of the present disclosure, it is possible to provide a touch display device having a dummy touch bridge structure capable of preventing specific areas (e.g. specific horizontal areas) within a screen from appearing strangely.

According to embodiments of the present disclosure, it is possible to provide a lightweight touch display device with a simple and easy-to-manufacture touch sensor structure.

DETAILED DESCRIPTION

Figure 1:
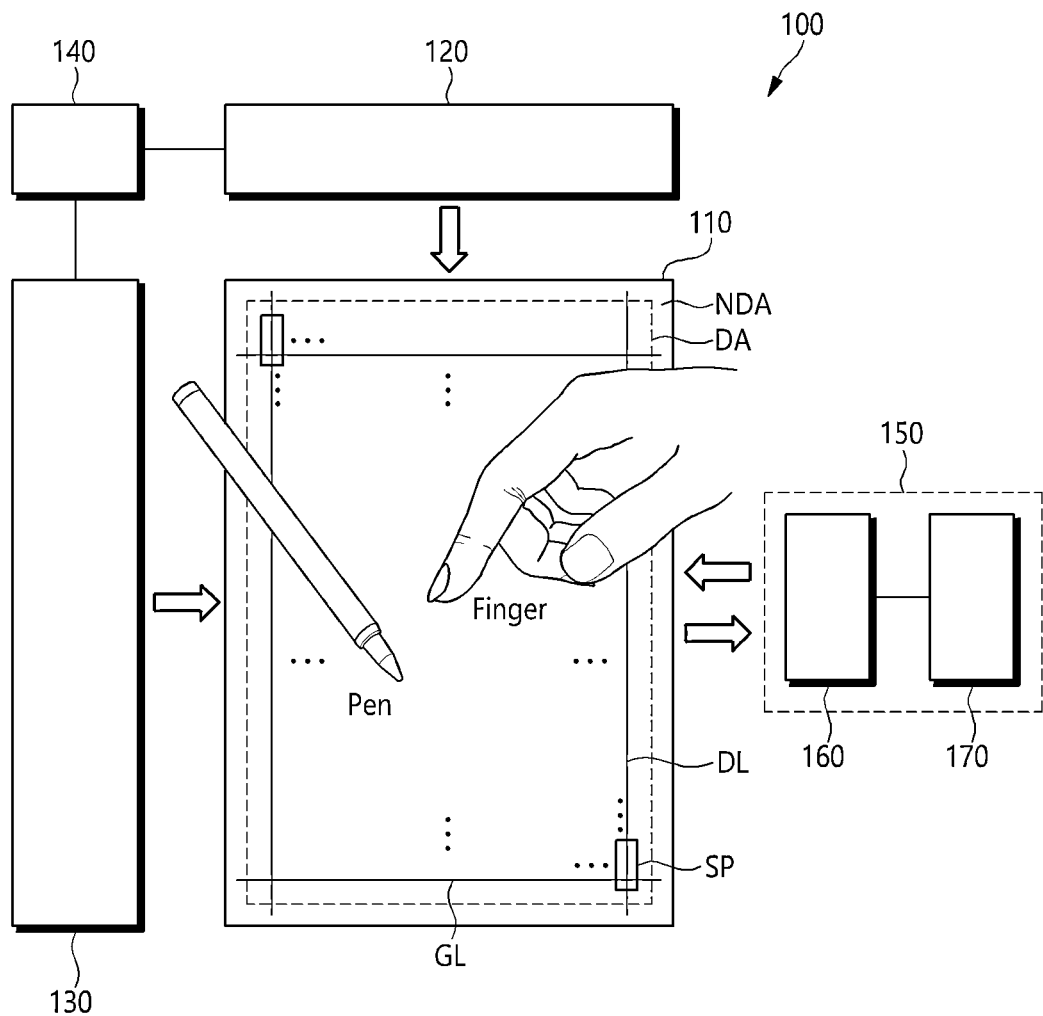
FIG. 1 is a system configuration diagram of a display device according to embodiments of the present disclosure.

Hereinafter, embodiments of the disclosure are described in detail with reference to the accompanying drawings. In assigning reference numerals to components of each drawing, the same components may be assigned the same numerals even when they are shown on different drawings. When determined to make the subject matter of the disclosure unclear, the detailed of the known art or functions may be skipped. As used herein, when a component "includes," "has," or "is composed of" another component, the component may add other components unless the component "only" includes, has, or is composed of" the other component. As used herein, the singular forms "a", "an" and "the" are intended to include the plural forms as well, unless the context clearly indicates otherwise.

Such denotations as "first," "second," "A," "B," "(a)," and "(b)," may be used in describing the components of the disclosure. These denotations are provided merely to distinguish a component from another, and the essence, order, or number of the components are not limited by the denotations.

In describing the positional relationship between components, when two or more components are described as "connected", "coupled" or "linked", the two or more components may be directly "connected", "coupled" or "linked", or another component may intervene. Here, the other component may be included in one or more of the two or more components that are "connected", "coupled" or "linked" to each other.

When such terms as, e.g., "after", "next to", "after", and "before", are used to describe the temporal flow relationship related to components, operation methods, and fabricating methods, it may include a non-continuous relationship unless the term "immediately" or "directly" is used.

When a component is designated with a value or its corresponding information (e.g., level), the value or the corresponding information may be interpreted as including a tolerance that may arise due to various factors (e.g., process factors, internal or external impacts, or noise).

Hereinafter, various embodiments of the disclosure are described in detail with reference to the accompanying drawings.

FIG. 1 is a system configuration diagram of a display device 100 according to embodiments of the present disclosure.

Referring to FIG. 1, a touch display device 100 may include a display panel 110 and a display driving circuit as components for displaying an image.

The display driving circuit may be a circuit for driving a display panel 110, and may include a data driving circuit 120, a gate driving circuit 130, and a display controller 140.

The display panel 110 may include a display area DA where an image is displayed and a non-display area NDA where an image is not displayed. The non-display area NDA may be an outer area of the display area DA, and may also be referred to as a bezel area. All or part of the non-display area NDA may be an area visible from the front of the touch display device 100, or may be an area which is bent and not visible from the front of the touch display device 100.

The display panel 110 may include a plurality of subpixels SP for displaying an image and various types of signal lines for driving the plurality of subpixels SP.

The touch display device 100 according to the embodiments of the present disclosure may be a liquid crystal display device, or may be a self-luminous display device in which the display panel 110 emits light by itself. If the touch display device 100 according to the embodiments of the present disclosure is a self-luminous display device, each of the plurality of subpixels SP may include a light emitting device.

For example, the touch display device 100 according to the embodiments of the present disclosure may be an organic light-emitting display device in which the light emitting device is implemented as an organic light-emitting diode (OLED). For another example, the touch display device 100 according to the embodiments of the present disclosure may be an inorganic light-emitting display device in which the light emitting device is implemented as an inorganic-based light-emitting diode. For another example, the touch display device 100 according to the embodiments of the present disclosure may be a quantum dot display device in which the light emitting device is implemented as a quantum dot, which is a semiconductor crystal emitting light by itself. However, present disclosure is not limited thereto.

Depending on the type of the touch display device 100, there may vary the structure of each of the plurality of subpixels SP. For example, if the touch display device 100 is a self-luminous display device in which the subpixel SP emits light by itself, each subpixel SP may include a light emitting device capable of emitting light by itself, one or more transistors including a driving transistor and a switching transistor, and one or more capacitors, without being limited thereto. As an example, one or more additional components could be further included.

For example, signal line of various types may include a plurality of data lines DL which transmit data signals (also referred to as data voltages or image signals) and a plurality of gate lines GL which transmit gate signals (also referred to as scanning signals), without being limited thereto. As an example, one or more additional signal lines (such as a power line, an emitting control line, a sensing line, etc.) could be further included.

The plurality of data lines DL and the plurality of gate lines GL may intersect each other. Each of the plurality of data lines DL may be arranged while extending in a first direction. Each of the plurality of gate lines GL may be arranged while extending in a second direction.

Here, the first direction may be a column direction and the second direction may be a row direction. Alternatively, the first direction may be a row direction and the second direction may be a column direction.

The data driving circuit 120 is a circuit for driving a plurality of data lines DL, and may output the data signal to the plurality of data lines DL. The gate driving circuit 130 is a circuit for driving a plurality of gate lines GL, and may output the gate signal to the plurality of gate lines GL. The display controller 140 is a device for controlling the data driving circuit 120 and the gate driving circuit 130, and may control the driving timing for the plurality of data lines DL and the driving timing for the plurality of gate lines GL.

The display controller 140 may supply a data driving control signal to the data driving circuit 120 to control the data driving circuit 120, and may supply a gate driving control signal to the gate driving circuit 130 to control the gate driving circuit 130.

The data driving circuit 120 may supply data signals to a plurality of data lines DL according to the driving timing control of the display controller 140. The data driving circuit 120 may receive image data in digital form from the display controller 140, convert the received image data into data signals in analog form, and output the converted image data to a plurality of data lines DL.

The gate driving circuit 130 may supply gate signals to a plurality of gate lines GL according to the timing control of the display controller 140. The gate driving circuit 130 may receive a first gate voltage corresponding to a turn-on level voltage and a second gate voltage corresponding to a turn-off level voltage together with various gate driving control signals (e.g., a start signal, a reset signal, etc.), generate gate signals, and supply the generated gate signals to a plurality of gate lines GL.

For example, the data driving circuit 120 may be connected to the display panel 110 by a tape automated bonding (TAB) method, or may be connected to a bonding pad of the display panel 110 by a chip-on-glass (COG) or chip-on-panel (COP) method, or may be connected to the display panel 110 by being implemented as a chip-on-film (COF) method, without being limited thereto.

The gate driving circuit 130 may be connected to the display panel 110 using a tape automated bonding (TAB) method, or may be connected to a bonding pad of the display panel 110 using a chip-on-glass (COG) or chip-on-panel (COP) method, or may be connected to the display panel 110 according to a chip-on-film (COF) method. Alternatively, the gate driving circuit 130 may be a gate-in-panel (GIP) type, and may be formed in the non-display area NDA of the display panel 110. The gate driving circuit 130 may be disposed on or connected to the substrate SUB. That is, if the gate driving circuit 130 is of the GIP type, it may be disposed in the non-display area NDA of the substrate SUB. The gate driving circuit 130 may be connected to the substrate in the case of a chip-on-glass (COG) type, chip-on-film (COF) type, etc.

Meanwhile, at least one of the data driving circuit 120 and the gate driving circuit 130 may be disposed in the display area DA of the display panel 110, without being limited thereto. For example, at least one of the data driving circuit 120 and the gate driving circuit 130 may be disposed not to overlap with the subpixels SP, or may be disposed to partially or entirely overlap with the subpixels SP.

The data driving circuit 120 may be connected to one side (e.g., the upper side or the lower side) of the display panel 110. Depending on the driving method, panel design method, etc., the data driving circuit 120 may be connected to both sides (e.g., the upper side and the lower side) of the display panel 110, or may be connected to two or more sides among the four sides of the display panel 110, without being limited thereto.

The gate driving circuit 130 may be connected to one side (e.g., the left side or the right side) of the display panel 110. Depending on the driving method, panel design method, etc., the gate driving circuit 130 may be connected to both sides (e.g., the left side and the right side) of the display panel 110, or may be connected to two or more sides among the four sides of the display panel 110, without being limited thereto.

The display controller 140 may be implemented as a separate component from the data driving circuit 120, or may be implemented as an integrated circuit integrated with the data driving circuit 120. The display controller 140 may be a timing controller used in typical display technology, or may be a control device capable of further performing other control functions including a timing controller, or may be a control device different from the timing controller, or may be a control device other than a timing controller, or may be a circuit within the control device. The display controller 140 may be implemented with various circuits or electronic components, such as an integrated circuit (IC), a field programmable gate array (FPGA), an application specific integrated circuit (ASIC), or a processor.

The display controller 140 may be mounted on a printed circuit board, a flexible printed circuit, etc., and may be electrically connected to the data driving circuit 120 and the gate driving circuit 130 through a printed circuit board, a flexible printed circuit, without being limited thereto.

The display controller 140 may transmit and receive signals with the data driving circuit 120 according to one or more predetermined interfaces. For example, the interface may include a low voltage differential signaling (LVDS) interface, an embedded clock point-point interface (EPI) interface, or a serial peripheral interface (SPI), without being limited thereto. Also, the display controller 140 may transmit and receive signals with the gate driving circuit 130.

In order to provide a touch sensing function in addition to an image display function, the touch display device 100 according to the embodiments of the present disclosure may include a touch panel and a touch sensing circuit 150 which senses a touch panel to detect whether a touch has occurred by a touch object such as a finger or pen, or to detect a touch location. Embodiments are not limited thereto. As an example, the touch panel and the touch sensing circuit 150 may be omitted, depending on the design.

The touch sensing circuit 150 may include a touch driving circuit 160 for driving and sensing the touch panel to generate and output touch sensing data, and a touch controller 170 for detecting touch occurrence or detecting a touch location using the touch sensing data.

The touch panel may include a plurality of touch electrodes as a touch sensor. The touch panel may further include a plurality of touch lines for electrically connecting the plurality of touch electrodes and the touch driving circuit 160. The touch panel or touch electrode may be also referred to as a touch sensor.

The touch panel may be located outside the display panel 110 or inside the display panel 110. If the touch panel is located outside the display panel 110, the touch panel is referred to as an external type. If the touch panel is an external type, the touch panel and the display panel 110 may be manufactured separately and combined during the assembly process. An external type touch panel may include a substrate and a plurality of touch electrodes on the substrate. The external type touch panel may further include a plurality of touch lines. The plurality of touch lines may be respectively connected to the plurality of touch electrodes. If the touch panel is located inside the display panel 110, the touch panel is referred to as an internal type. If the touch panel is an internal type, the touch panel may be formed inside the display panel 110 during the manufacturing process of the display panel 110.

The touch driving circuit 160 may supply a touch driving signal to at least one of the plurality of touch electrodes and sense at least one of the plurality of touch electrodes to generate touch sensing data.

The touch sensing circuit 150 may perform touch sensing in a self-capacitance sensing manner or a mutual-capacitance sensing manner.

When the touch sensing circuit 150 performs touch sensing in a self-capacitance sensing manner, the touch sensing circuit 150 may perform touch sensing based on the capacitance between each touch electrode and a touch object (e.g., a finger, a pen, etc.).

According to the self-capacitance sensing manner, each of the plurality of touch electrodes may act as a driving touch electrode and also act as a sensing touch electrode. The touch driving circuit 160 may drive all or part of the plurality of touch electrodes and sense all or part of the plurality of touch electrodes.

When the touch sensing circuit 150 performs touch sensing using a mutual-capacitance sensing manner, the touch sensing circuit 150 may perform touch sensing based on the capacitance between the touch electrodes.

According to the mutual-capacitance sensing manner, a plurality of touch electrodes may be divided into driving touch electrodes and sensing touch electrodes. The touch driving circuit 160 may drive the driving touch electrodes and sense the sensing touch electrodes.

As described above, the touch sensing circuit 150 may perform touch sensing in a self-capacitance sensing manner and/or a mutual-capacitance sensing manner. However, hereinafter, for the convenience of explanation, it is assumed that the touch sensing circuit 150 performs touch sensing in a self-capacitance sensing manner, without being limited thereto.

The touch driving circuit 160 and the touch controller 170 included in the touch sensing circuit 150 may be implemented as separate devices or may be implemented as one device.

In addition, the touch driving circuit 160 and the data driving circuit 120 may be implemented as separate devices or may be implemented as one device.

The touch display device 100 may further include a power supply circuit which supplies various types of power to the display driving circuit and/or the touch sensing circuit 150. In this time, the voltage from the power supply circuit are applied to the display driving circuit and/or the touch sensing circuit 150 to drive thereto.

The touch display device 100 according to the embodiments of the present disclosure may be a mobile terminal such as a smart phone or a tablet, or a monitor or television (TV) of various sizes, and is not limited thereto, and may be a display of various types and sizes capable of displaying information or images, without being limited thereto.

Figure 2:
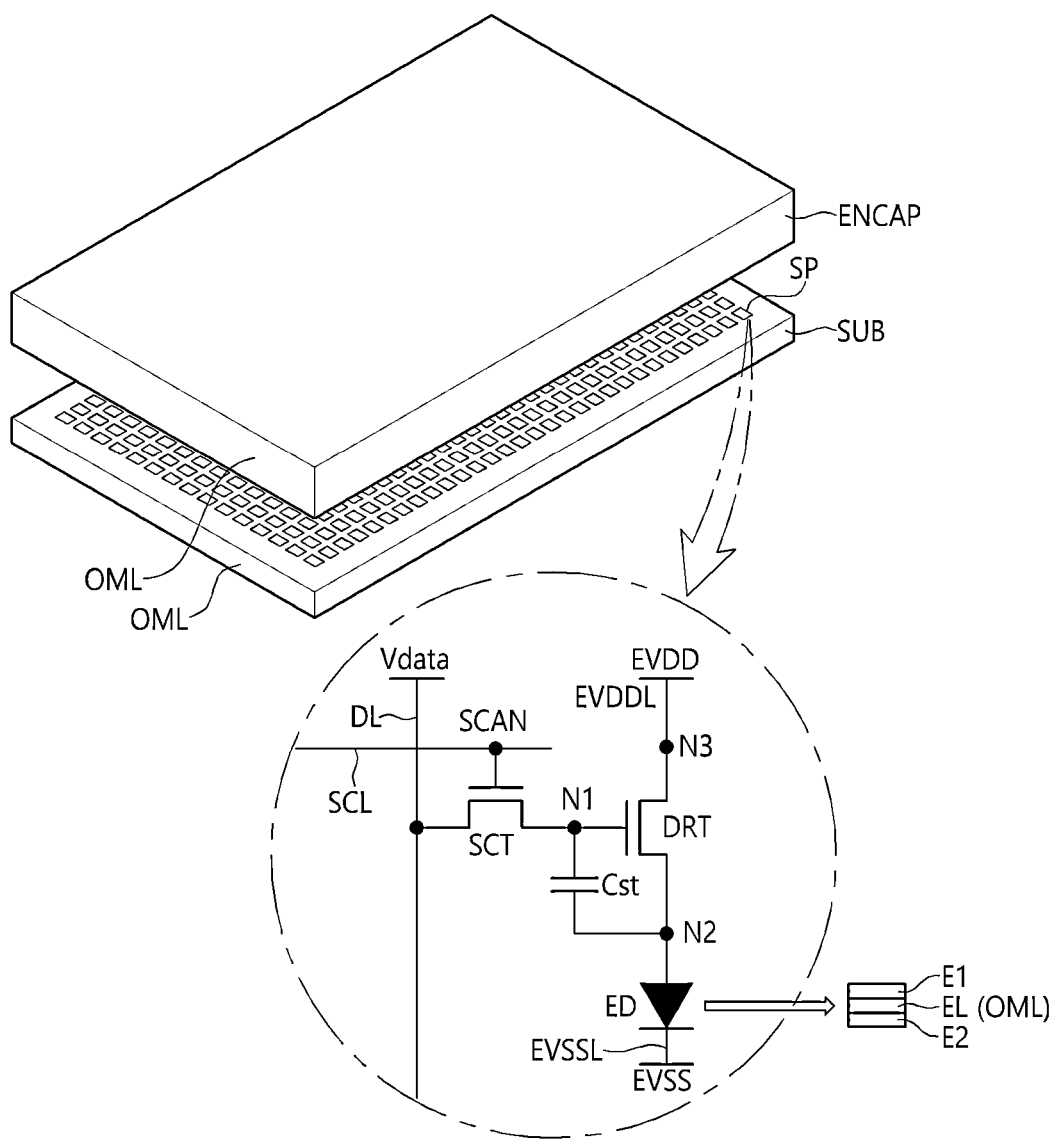
FIG. 2 illustrates a schematic structure of a display panel of a touch display device according to embodiments of the present disclosure.

FIG. 2 illustrates a schematic structure of a display panel 110 of a touch display device 100 according to embodiments of the present disclosure.

Referring to FIG. 2, the display panel 110 may include a plurality of subpixels SP formed on a substrate SUB. Each of the plurality of subpixels SP may include a light emitting device ED, a driving transistor DRT for driving the light emitting device ED, a scanning transistor SCT for transmitting a data voltage Vdata to a first node N1 of the driving transistor DRT, and a storage capacitor Cst for maintaining a constant voltage during one frame, without being limited thereto. More or less components can be included.

For example, the driving transistor DRT may be disposed for each subpixel SP. The driving transistor DRT may include a first node N1 to which a data voltage Vdata may be applied, a second node N2 electrically connected to the light emitting device ED, and a third node N3 to which a first driving power signal EVDD is applied from a first driving power line EVDDL. In the driving transistor DRT, the first node N1 may be a gate node, the second node N2 may be a source node or a drain node, and the third node N3 may be a drain node or a source node.

The light emitting device ED may include a first electrode E1, an emission layer EL disposed between the first electrode E1 and the second electrode E2, and a second electrode E2.

For example, the first electrode E1 of the light emitting device ED may be disposed for each subpixel SP, and may be electrically connected to the second node N2 of the driving transistor DRT of each subpixel SP. The second electrode E2 of the light emitting device ED may be disposed in common for a plurality of subpixels SP, and may be applied with a second driving power signal EVSS. The first electrode E1 may be referred to as a pixel electrode and the second electrode E2 may be referred to as a common electrode.

In addition, for example, the first electrode E1 may be an anode electrode and the second electrode E2 may be a cathode electrode. Alternatively, the first electrode E1 may be a cathode electrode and the second electrode E2 may be an anode electrode.

The display panel 110 may further include a second driving power line VSL for supplying a second driving power signal EVSS to the second electrode E2. Also, the display panel 110 may further include a first driving power line DVL for supplying a s first driving power signal EVDD to the third node N3 of the driving transistor DRT.

Hereinafter, for convenience of explanation, it is assumed that the first electrode E1 is a pixel electrode and an anode electrode, and the second electrode E2 is a common electrode and a cathode electrode.

For example, the light emitting device ED may be an organic light emitting diode (OLED), an inorganic light emitting diode, or a quantum dot light emitting device. In this case, if the light emitting device ED is an organic light emitting diode, the light emitting device ED may include an organic layer OML containing an organic material, and the organic layer OML may include an emission layer EL which is an organic light emitting layer.

The scanning transistor SCT may be connected between the first node N1 of the driving transistor DRT and the corresponding data line DL, and may control the voltage state of the first node N1 of the driving transistor DRT.

The scanning transistor SCT may be turned on or off in response to a scanning gate signal SCAN supplied from the corresponding scanning gate line SCL. For example, the scanning transistor SCT may control a connection between the first node N1, which is the gate node of the driving transistor DRT, and the corresponding data line DL among the plurality of data lines DL, according to a scanning gate signal SCAN supplied from the corresponding scanning gate line SCL among a plurality of scanning gate lines SCL, which are a type of gate line GL.

A drain node or a source node of the scanning transistor SCT may be electrically connected to the corresponding data line DL. The source node or the drain node of the scanning transistor SCT may be electrically connected to the first node N1 of the driving transistor DRT. A gate node of the scanning transistor SCT may be electrically connected to the scanning gate line SCL, which is a type of gate line GL, and may receive the scanning gate signal SCAN.

The scanning transistor SCT may be turned on by the scanning gate signal SCAN of a turn-on level voltage, and may transmit the data voltage Vdata supplied from the corresponding data line DL to the first node N1 of the driving transistor DRT. Also, the scanning transistor SCT may be turned off by the scanning gate signal SCAN of a turn-off level voltage, without being limited thereto.

The scanning transistor SCT may be turned on by the scanning gate signal SCAN of the turn-on level voltage, and may be turned off by the scanning gate signal SCAN of the turn-off level voltage. Here, if the scanning transistor SCT is an n-type, the turn-on level voltage may be a high level voltage, and the turn-off level voltage may be a low level voltage. If the scanning transistor SCT is p-type, the turn-on level voltage may be a low level voltage and the turn-off level voltage may be a high level voltage. When the scanning transistor SCT is turned on, the data voltage Vdata supplied from the corresponding data line DL may be transmitted to the first node N1 of the driving transistor DRT.

The storage capacitor Cst may be electrically connected between the first node N1 and the second node N2 of the driving transistor DRT.

The storage capacitor Cst may be an external capacitor intentionally designed outside the driving transistor DRT, rather than a parasitic capacitor (e.g., Cgs, Cgd) which may exist between the first node N1 and the second node N2 of the driving transistor DRT.

Each of the driving transistor DRT and the scanning transistor SCT may be an n-type transistor or a p-type transistor.

As illustrated in FIG. 2, each subpixel SP may have a 2T (Transistor)-1C (Capacitor) structure including two transistors DRT and SCT, and one capacitor Cst, and may further include one or more transistors or one or more capacitors, depending on the case. For example, 3T1C, 4T1C, 5T1C, 3T2C, 4T2C, 5T2C, 6T2C, 7T1C, 7T2C, 8T2C structures, etc. are also possible.

Since the circuit elements (particularly, the light emitting device ED) in each subpixel SP are vulnerable to external moisture or oxygen, the display panel 110 may further include an encapsulation layer ENCAP. The encapsulation layer ENCAP may prevent external moisture or oxygen from penetrating into the circuit elements (particularly, the light emitting device ED).

The encapsulation layer ENCAP may be disposed on the second electrode E2. The encapsulation layer ENCAP may have a single-layer structure or a multi-layer structure including a plurality of sub-encapsulation layers. For example, the encapsulation layer ENCAP may have a multi-layer structure in which an inorganic encapsulation layer, an organic encapsulation layer, and an inorganic encapsulation layer are stacked. The inorganic encapsulation layer may reduce or prevent penetration of moisture or oxygen from the outside. The organic encapsulation layer may serve to cover particles and buffer stress between layers, for example, when the display panel is bent.

As described above, the display panel 110 may include an organic layer OML which is disposed inside the light emitting device ED or disposed above or below the light emitting device ED, and includes an organic material. That is, the organic layer OML included in the light emitting device ED may be composed of an organic material, and may include the emission layer EL. In addition, the encapsulation layer ENCAP may include an organic encapsulation layer that is an organic layer OML including an organic material. In addition, an organic layer OML including an organic material may be disposed below the encapsulation layer ENCAP for a planarization function, etc. In addition, an organic layer OML including an organic material may be disposed above the encapsulation layer ENCAP. In this way, an organic layer OML including an organic material may be disposed at various locations on the display panel 110 for various purposes.

The touch display device 100 according to the embodiments of the present disclosure may have a top emission structure in which light is emitted in the opposite direction of the substrate SUB of the display panel 110. In this case, the first electrode E1 as a pixel electrode may be a reflective electrode (e.g., reflective metal) or a transparent electrode (e.g., transparent metal), and the second electrode E2 as a common electrode may be a transparent electrode (e.g., transparent metal). Alternatively, the touch display device 100 according to the exemplary embodiments of the present disclosure may have a bottom emission structure.

Figure 3:
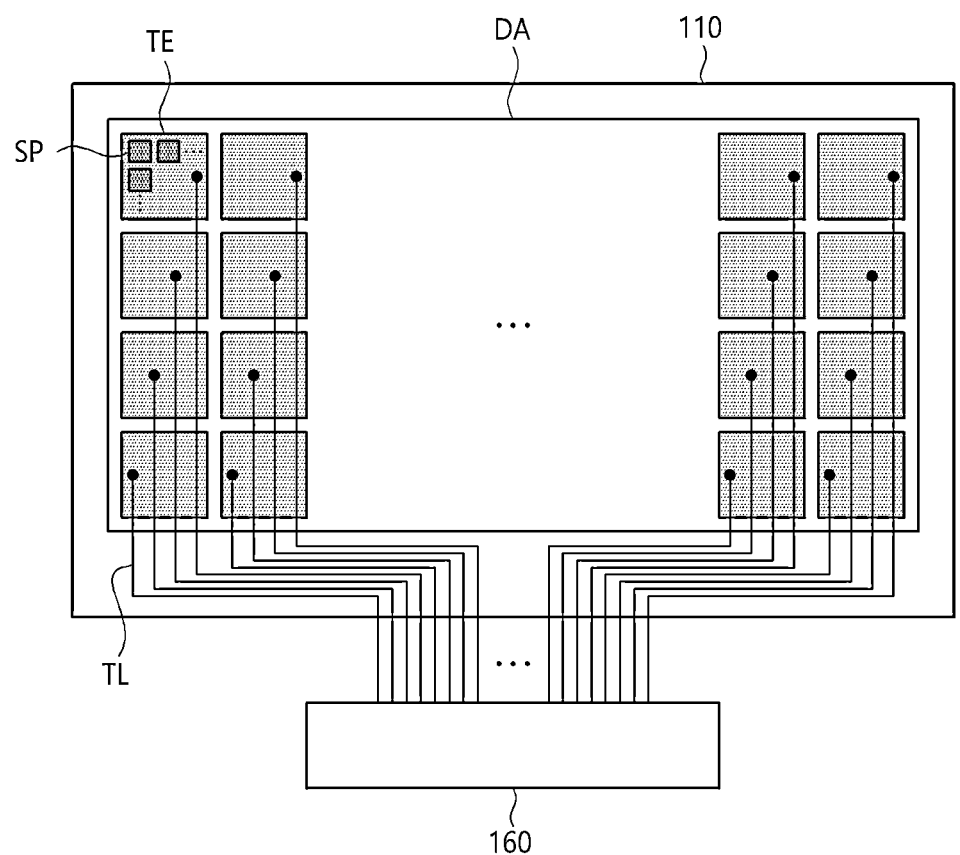
FIG. 3 illustrates a touch sensing system of a touch display device according to embodiments of the present disclosure.

FIG. 3 illustrates a touch sensing system of a touch display device 100 according to embodiments of the present disclosure.

Referring to FIG. 3, the display panel 110 of the touch display device 100 may have a built-in touch panel. The touch panel built into the display panel 110 may be also referred to as a built-in touch panel, an in-cell type touch panel, or an on-cell type touch panel.

Referring to FIG. 3, if the display panel 110 of the touch display device 100 according to the embodiments of the present disclosure has a built-in touch panel, the display panel 110 may include a touch sensor arranged within the display area DA.

The touch sensor may include a plurality of touch electrodes TE disposed separately from each other within the display area DA.

The touch sensor may further include a plurality of touch lines TL for electrically connecting each of the plurality of touch electrodes TE to the touch driving circuit 160. Here, the touch line TL may be also called a touch routing line.

According to the example of FIG. 3, each of the plurality of touch electrodes TE may be disposed apart from each other. In this case, each of the plurality of touch electrodes TE may not overlap with each other in a vertical direction.

Alternatively, the plurality of touch electrodes TE may include touch electrodes TE in a first direction and touch electrodes TE in a second direction different from the first direction. In this case, the touch electrodes TE in the first direction and the touch electrodes TE in the second direction may intersect each other.

According to the example of FIG. 3, each of the plurality of touch electrodes TE may be connected to one or more touch lines TL. Each touch line TL may electrically connect the corresponding touch electrode TE to the touch driving circuit 160.

Each touch line TL may overlap with one or more touch electrodes TE.

Referring to FIG. 3, for example, among the touch electrodes TE arranged in a first column, a first touch electrode TE arranged in a first row may be electrically connected to a first touch line TL. The first touch line TL may overlap with some of the touch electrodes TE arranged in the first column other than the first touch electrode TE without being electrically connected thereto.

Referring to FIG. 3, for example, when the touch display device 100 senses a touch based on self-capacitance manner, the touch driving circuit 160 may supply a touch driving signal to at least one touch electrode TE among the plurality of touch electrodes TE, and sense the touch electrode TE supplied with the touch driving signal.

Each of the plurality of touch electrodes TE may be an electrode without an opening, or may be a mesh-type electrode with a plurality of openings formed therein. As one example, a color filter array including a color filter and a black matrix may be further disposed on the plurality of touch electrodes, or a lens array may be further disposed on the plurality of touch electrodes.

In addition, each of the plurality of touch electrodes TE may be an opaque electrode or a transparent electrode. Alternatively, each of the plurality of touch electrodes TE may include an opaque electrode and a transparent electrode.

Each of the plurality of touch electrodes TE may overlap with an area where two or more subpixels SP are formed. Alternatively, each of the plurality of touch electrodes TE may be located in an area not overlapping with a subpixel SP.

The sensing value for the touch electrode TE supplied with the touch driving signal may be a value corresponding to the capacitance or a change of the capacitance at the touch electrode TE to which the touch driving signal is supplied. The capacitance at the touch electrode TE supplied with the touch driving signal may be the capacitance between the touch electrode TE supplied with the touch driving signal and a touch object such as a finger.

As described above, in the touch display device 100 according to the embodiments of the present disclosure, if a touch sensor including a plurality of touch electrodes TE is built into the display panel 110, during the manufacturing process of the display panel 110, the touch electrodes TE and touch lines TL may also be formed together when forming patterns of electrodes and lines related to display driving.

Figure 4:
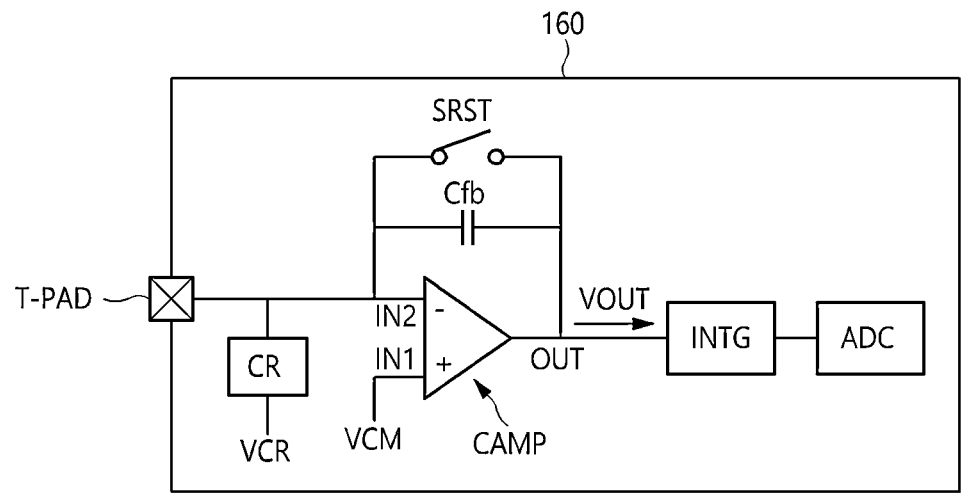
FIG. 4 illustrates a touch driving circuit of a touch display device according to embodiments of the present disclosure.

FIG. 4 illustrates a touch driving circuit 160 of a touch display device 100 according to embodiments of the present disclosure.

Referring to FIG. 4, the touch driving circuit 160 may include S (S is a natural number greater than or equal to 1) charge amplifiers CAMPs and Q (Q is a natural number greater than or equal to 1) analog-to-digital converters ADCs.

The touch driving circuit 160 may further include a first selection circuit for selecting S touch lines TL among a plurality of touch lines TL and electrically connecting S touch lines TL to S charge amplifiers CAMPs. In addition, the touch driving circuit 160 may further include a second selection circuit which selects Q charge amplifiers CAMPs among the S charge amplifiers CAMPs and connects Q charge amplifiers CAMPs to Q analog-to-digital converters ADCs.

Referring to FIG. 4, the charge amplifier CAMP may include a first input terminal IN1, a second input terminal IN2, and an output terminal OUT.

The charge amplifier CAMP may further include a feedback capacitor Cfb connected between the second input terminal IN2 and the output terminal OUT. If charge flows into the charge amplifier CAMP, the charge may be charged in the feedback capacitor Cfb.

The charge amplifier CAMP may further include a reset switch SRST connected between the second input terminal IN2 and the output terminal OUT. While the touch driving circuit 160 performs an operation for touch sensing, the reset switch SRST may be in an off state.

A driving signal VCM may be input to the first input terminal IN1 of the charge amplifier CAMP. The second input terminal IN2 of the charge amplifier CAMP may be electrically connected to one touch pad T-PAD selected from among a plurality of touch pads T-PADs arranged on the display panel 110. Here, a touch line TL may be electrically connected to a touch pad T-PAD electrically connected to the second input terminal IN2.

The driving signal VCM input to the first input terminal IN1 of the charge amplifier CAMP may be supplied to a touch line TL connected to a touch pad T-PAD through the second input terminal IN2 of the charge amplifier CAMP. The driving signal VCM supplied to the touch line TL may be supplied to a touch electrode TE connected to the touch line TL.

Referring to FIG. 4, the touch driving circuit 160 may further include a charge removal circuit CR connected to a second input terminal IN2 of the charge amplifier CAMP. The charge removal circuit CR may control the amount of charge at the second input terminal IN2 of the charge amplifier CAMP according to an input charge removal control signal VCR.

If charge flows into the second input terminal IN2 of the charge amplifier CAMP, the charge may be charged in the feedback capacitor Cfb. An output voltage VOUT corresponding to the amount of charge charged in the feedback capacitor Cfb may be output to the output terminal OUT of the charge amplifier CAMP.

The amount of charge charged in the feedback capacitor Cfb may vary depending on the electrical state (e.g., capacitance, etc.) of the touch electrode TE electrically connected to the second input terminal IN2 of the charge amplifier CAMP.

The analog-to-digital converter ADC may convert the output voltage VOUT output from the output terminal OUT of the charge amplifier CAMP into a digital value and output the converted output voltage.

Referring to FIG. 4, the touch driving circuit 160 may further include an integrator INTG connected between the output terminal OUT of the charge amplifier CAMP and the analog-to-digital converter ADC. The integrator INTG may integrate the output voltage VOUT output from the output terminal OUT of the charge amplifier CAMP, and output an integrated value of the integrated output voltage VOUT. In addition, the analog-to-digital converter ADC may convert the integrated value into a digital value. Accordingly, the value output from the analog-to-digital converter ADC may have a value which allows more precise information processing.

For example, during a touch period for touch sensing, the value output from the analog-to-digital converter ADC may be referred to as a touch sensing value. The touch controller 170 may determine the presence or absence of a touch and/or the touch coordinates by using the touch sensing value output from the analog-to-digital converter ADC.

Figure 5:
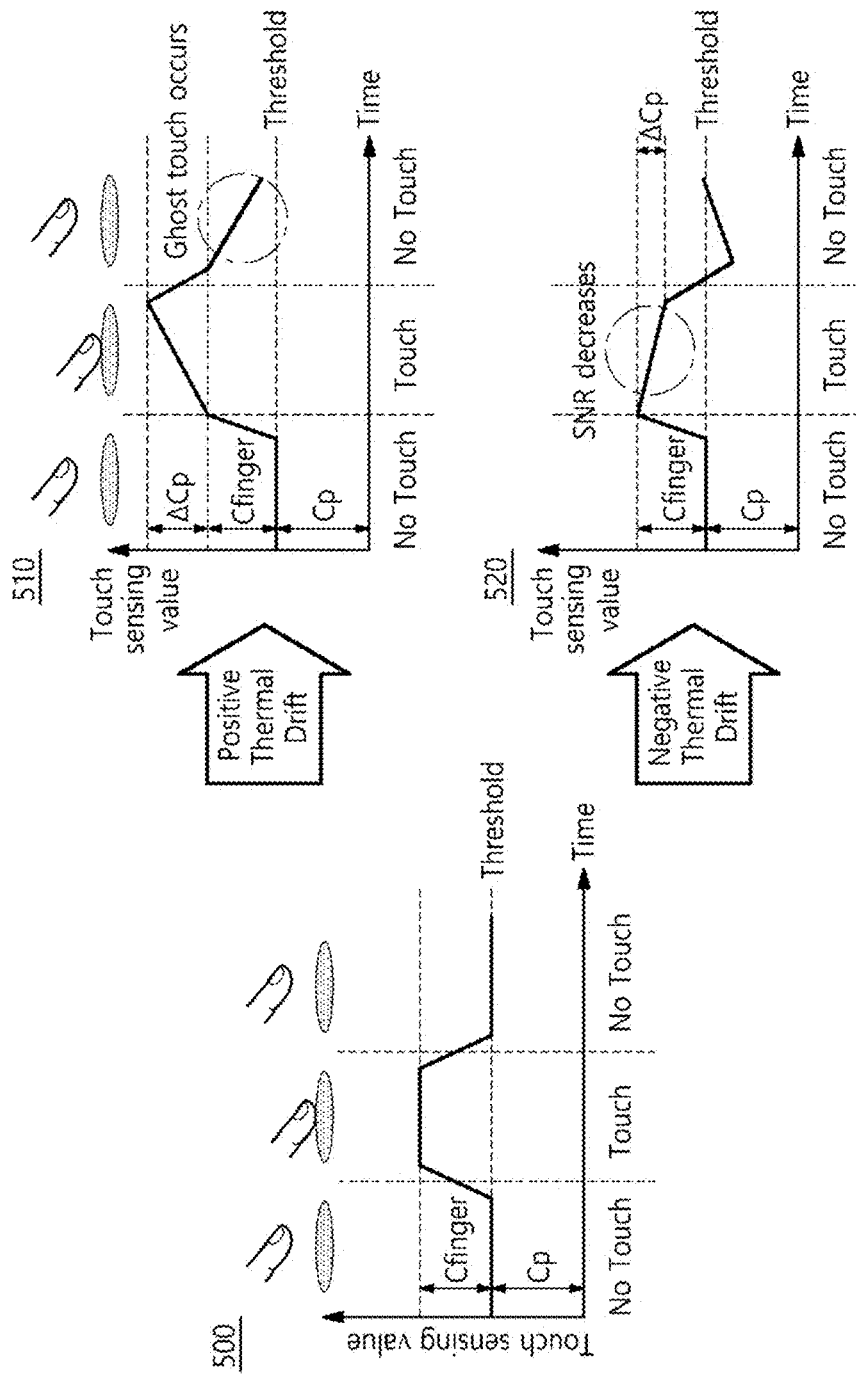
FIG. 5 is a diagram for explaining a change in touch sensitivity when a thermal drift occurs due to a touch pointer in a touch display device according to embodiments of the present disclosure.

FIG. 5 is a diagram for explaining a change in touch sensitivity when a thermal drift occurs due to a touch pointer in a touch display device 100 according to embodiments of the present disclosure.

The three graphs 500, 510 and 520 illustrated in FIG. 5 are graphs representing touch sensing values output from the touch driving circuit 160 from before the touch occurrence to after the touch occurrence when the user touches the display panel 110 with a touch pointer such as a finger or a pen for a certain period of time.

A reference graph 500 illustrates touch sensing values over time for a normal driving state in which the temperature of the touch pointer is not transmitted to the display panel 110 when the user touches the display panel 110 with a touch pointer such as a finger or a pen. For example, the reference graph 500 shows the touch sensing value before the touch occurrence, the touch sensing value when a touch occurs and the touch sensing value after a touch occurs.

Referring to the reference graph 500, the touch sensing value before the touch occurrence may have a threshold value. Here, the threshold value may be a touch sensing value naturally induced by the parasitic capacitance Cp formed on the corresponding touch electrode TE inside the display panel 110 before the touch occurrence.

Referring to the reference graph 500, when a touch occurs, a finger capacitance Cfinger may be formed between the corresponding touch electrode TE and the finger, and accordingly, the touch sensing value may increase. The increased touch sensing value may be determined by the parasitic capacitance Cp and the finger capacitance Cfinger. Here, the finger capacitance Cfinger may be a self-capacitance.

Referring to the reference graph 500, after a touch occurs, the touch sensing value may be increased and then maintained at a constant level for the period during which the touch is maintained.

Referring to the reference graph 500, when the user releases the touch, i.e., when the touch ends, the finger capacitance Cfinger may disappears, and the touch sensing value may decrease to a level before the touch occurs.

Referring to FIG. 5, a first graph 510 and a second graph 520 represent touch sensing values over time for a state in which the temperature of the touch pointer is transmitted to the display panel 110 if the temperature of the touch pointer is higher than the temperature of the display panel 110 when the user touches the display panel 110 with a touch pointer such as a finger or a pen.

For example, the first graph 510 shows the touch sensing value before the touch occurrence, the touch sensing value when a touch occurs and the touch sensing value after a touch occurs. Referring to FIG. 5, referring to the first graph 510, the touch sensing value may have a threshold value before the touch occurs. Here, the threshold value may be a touch sensing value naturally induced by the parasitic capacitance Cp formed on the corresponding touch electrode TE inside the display panel 110 even before the touch occurs.

Referring to the first graph 510, if a touch occurs, a finger capacitance Cfinger may be formed between the corresponding touch electrode TE and the finger, and accordingly, the touch sensing value may increase. The increased touch sensing value may be determined by the parasitic capacitance Cp and the finger capacitance Cfinger.

Referring to the first graph 510, after a touch occurs, during the period in which the touch is maintained, the touch sensing value may not remain constant and there may be occurred a phenomenon in which the touch sensing value additionally increases.

As a result of analyzing the cause of the additional increase in the touch sensing value, the following analysis results have been obtained. If the temperature of the touch pointer touching the display panel 110 is higher than the surface temperature of the display panel 110 (or the temperature of the corresponding touch electrode TE), the temperature of the touch pointer may be transmitted to the display panel 110, and there may be occurred a temperature change (e.g., temperature increase) in the display panel 110. This may cause an increase in parasitic capacitance in the touch electrode TE, which may lead to a further increase in the touch sensing value.

As the temperature of the touch pointer is transmitted to the display panel 110, a dielectric constant of the organic material constituting the organic layer OML included in the display panel 110 may change due to the temperature change (e.g., temperature increase) of the display panel 110. As a result, the parasitic capacitance at the corresponding touch electrode TE may increase due to the unique characteristics of the organic material. The increase in parasitic capacitance ΔCp at the corresponding touch electrode TE may further increase the touch sensing value. Here, during the touch occurrence time, the parasitic capacitance increase ΔCp may be a phenomenon caused by the corresponding organic material when the temperature increases, and may correspond to the material-specific characteristics of the corresponding organic material.

As in the first graph 510, if the temperature of the touch pointer is higher than the surface temperature of the display panel 110, the phenomenon of the parasitic capacitance increases ΔCp due to the high temperature of the touch pointer during the touch occurrence time may be referred to as a positive thermal drift phenomenon.

Referring to the first graph 510, when the user releases the touch, that is, when the touch ends, the touch sensing value may decrease, but may not immediately drop to the level before the touch occurrence, but may remain at a level above the touch threshold for a short period of time even after the touch ends. Here, the touch threshold may mean the minimum touch sensing value for determining that a touch has occurred. As a result, the touch may still be recognized as existing even after the touch ends. In this way, a touch which does not actually exist but is recognized as existing may be referred to as a ghost touch. In addition, if the ghost touch is recognized, the ghost touch may cause a significant decrease in touch sensitivity. Also, the touch sensitivity may be reduced not only by finger touch but also by image change.

For example, the second graph 520 shows the touch sensing value before the touch occurrence, the touch sensing value when a touch occurs and the touch sensing value after a touch occurs. Referring to the second graph 520 in FIG. 5, before a touch occurs, the touch sensing value may have a threshold value. Here, the threshold value may be a touch sensing value naturally induced by a parasitic capacitance Cp formed in the corresponding touch electrode TE inside the display panel 110 even before a touch occurs.

Referring to the second graph 520, if a touch occurs, a finger capacitance Cfinger may be formed between the corresponding touch electrode TE and the finger, and accordingly, the touch sensing value may increase. The increased touch sensing value may be determined by the parasitic capacitance Cp and the finger capacitance Cfinger.

Referring to the second graph 520, after a touch occurs, during the period in which the touch is maintained, the touch sensing value may not remain constant, and instead, the touch sensing value may decrease.

As a result of analyzing the cause of the decrease in the touch sensing value, the following analysis results have been obtained. If the temperature of the touch pointer (such as a finger or a pen) touching the display panel 110 is higher than the surface temperature of the display panel 110 (or the temperature of the corresponding touch electrode TE), the temperature of the touch pointer may be transmitted to the display panel 110, which may cause a temperature change in the display panel 110. This may cause a decrease in the parasitic capacitance in the touch electrode TE, which may lead to a decrease in the touch sensing value.

As the temperature of the touch pointer is transmitted to the display panel 110, a dielectric constant of the organic material constituting the organic layer OML included in the display panel 110 may change according to the temperature change (e.g., temperature increase). As a result, a parasitic capacitance in the touch electrode TE may decrease due to the unique characteristics of the organic material. The parasitic capacitance decrease Δ Cp in the touch electrode TE may decrease the touch sensing value. Here, during the touch occurrence time, the parasitic capacitance decrease Δ Cp may be a phenomenon caused by the organic material when the temperature increases, and may correspond to the material-unique characteristics of the organic material.

As in the second graph 520, in the case that the temperature of the touch pointer is higher than the surface temperature of the display panel 110, a phenomenon of the parasitic capacitance decrease Δ Cp due to the high temperature of the touch pointer during the touch occurrence time may be referred to as a negative thermal drift phenomenon.

In this way, if the touch sensing value decreases while the user maintains the touch, a signal to noise ratio (SNR) may decrease, which may deteriorate the touch sensitivity, as shown in the second graph 520. In addition, if the ghost touch is recognized, the ghost touch may cause a significant decrease in touch sensitivity, as shown in the first graph 510.

Figure 6A:
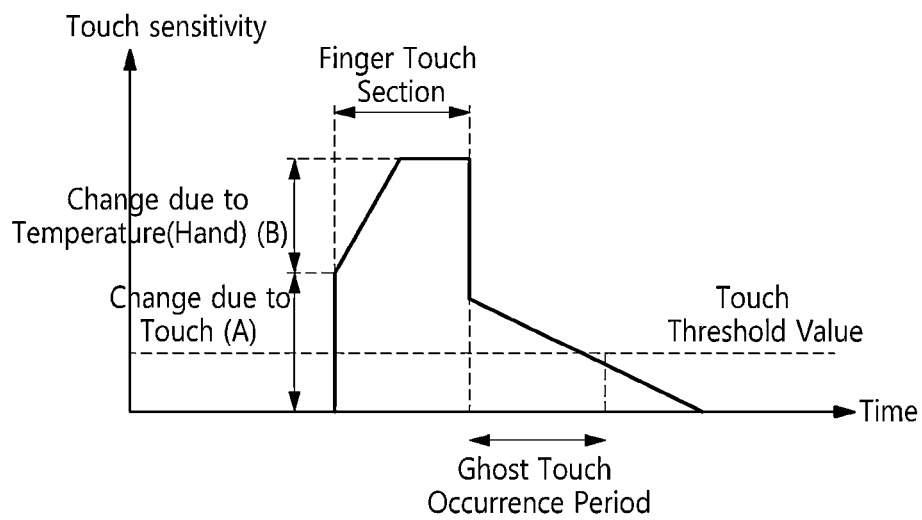
FIG. 6A is a diagram for explaining a change in touch sensitivity caused by a finger touch in a touch display device according to embodiments of the present disclosure.

FIG. 6A is a diagram for explaining a change in touch sensitivity (e.g., change in touch sensing value) caused by a finger touch in a touch display device 100 according to embodiments of the present disclosure.

Referring to FIG. 6A, if a finger touch occurs, the temperature of the finger may be transferred to the display panel 110, which may cause a positive thermal drift phenomenon, without being limited thereto. The temperature change of the display panel 110 may occur due to the finger touch. That is, if the temperature of the touch pointer is higher than the surface temperature of the display panel 110, the parasitic capacitance increases ΔCp due to the high temperature of the touch pointer during the touch occurrence time.

Referring to FIG. 6A, a temperature change of the display panel 110 may occur due to a finger touch. The amount of change in the touch sensing value due to the temperature change of the display panel 110 by the finger touch may include an amount of change (A) in the touch sensing value due to the finger touch and an amount of change (B) in the touch sensing value due to the temperature of the finger.

The amount of change (A) in the touch sensing value due to the finger touch may be a normal part necessary for touch sensing, and may be a part which occurs due to the finger capacitance Cfinger.

The amount of change (B) in the touch sensing value due to the temperature of the finger may be an unwanted part which may cause a deterioration of the touch sensitivity, and may be a part caused by an increase in parasitic capacitance ΔCp due to a positive thermal drift phenomenon during the finger touch period.

After the finger touch disappears, the touch sensing value may decrease, but may not immediately fall to the level before the touch occurrence, and may have a value higher than the touch threshold for a certain period of time. Here, the touch threshold may mean a minimum touch sensing value for determining the touch occurrence.

Even if the finger touch disappears, if a touch sensing value higher than the touch threshold is obtained from the touch driving circuit 160 for a certain period of time (i.e., ghost touch occurrence period), the touch controller 170 may incorrectly recognize the touch occurrence. This ghost touch recognition may be a factor that significantly reduces touch sensitivity.

Alternatively, even if a touch does not actually occur, if a touch sensing value higher than the touch threshold is obtained from the touch driving circuit 160 according to a finger touch, the touch controller 170 may recognize that a touch has been occurred during a period (e.g., ghost touch occurrence period) in which the touch sensing value is higher than the touch threshold, without being limited thereto. This ghost touch recognition may be a factor that significantly reduces touch sensitivity.

Figure 6B:
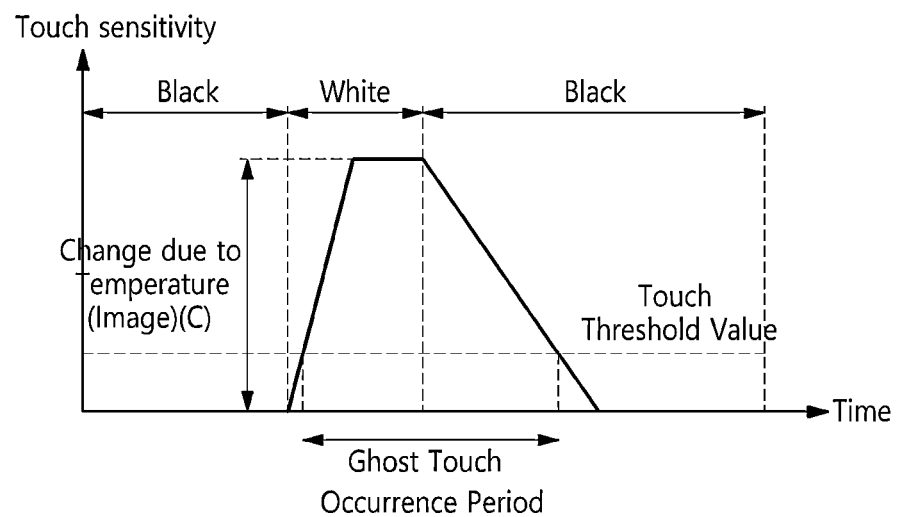
FIG. 6B is a diagram for explaining a change in touch sensitivity according to an image change in a touch display device according to embodiments of the present disclosure.

FIG. 6B is a diagram for explaining a change in touch sensitivity (e.g., change in touch sensing value) according to an image change in a touch display device 100 according to embodiments of the present disclosure.

Referring to FIG. 6B, the touch sensitivity may be reduced not only by finger touch but also by an image change.

Referring to FIG. 6B, there is illustrated that the phenomenon of the increase in the surface temperature of the display panel due to finger touch may occur similarly in the case of the image change. That is, if the image changes, a positive thermal drift phenomenon may occur similarly. That is, even though no touch occurs, a change in the touch sensing value may occur due to the image change.

Referring to FIG. 6B, an amount of change in the touch sensing value due to the image change may be considered as an amount of change (C) in the touch sensing value due to the temperature change of the display panel 110 corresponding to the image change.

For example, when changing from a low-gray image (e.g., a black image) to a high-gray image (e.g., a white image), there may be acquired a touch sensing value higher than the touch threshold value from the touch driving circuit 160 even though the touch does not actually occur. When changing from a high-gray image (e.g., a white image) to a low-gray image (e.g., a black image), the touch sensing value may not immediately fall below the touch threshold value, but may fall below the touch threshold value after a short period of time.

Referring to FIG. 6B, even if a touch does not actually occur, if a touch sensing value higher than the touch threshold is obtained from the touch driving circuit 160 according to an image change, the touch controller 170 may recognize that a touch has been occurred during a period (e.g., ghost touch occurrence period) in which the touch sensing value is higher than the touch threshold. This ghost touch recognition may be a factor that significantly reduces touch sensitivity.

Accordingly, the embodiments of the present disclosure may propose a temperature sensing structure and a temperature sensing method capable of preventing or at least reducing a decrease in touch sensitivity due to a temperature change of the display panel 110, and a compensation processing method for a change in touch sensitivity due to a temperature change.

Hereinafter, it will be described a temperature sensing structure and a temperature sensing method according to the embodiments of the present disclosure, and a compensation processing method for a change in touch sensitivity due to a temperature change. Herein, a temperature change of the display panel 110 may be caused by the temperature of a touch pointer such as a finger or a pen, or may be related to an image change.

Figure 7:
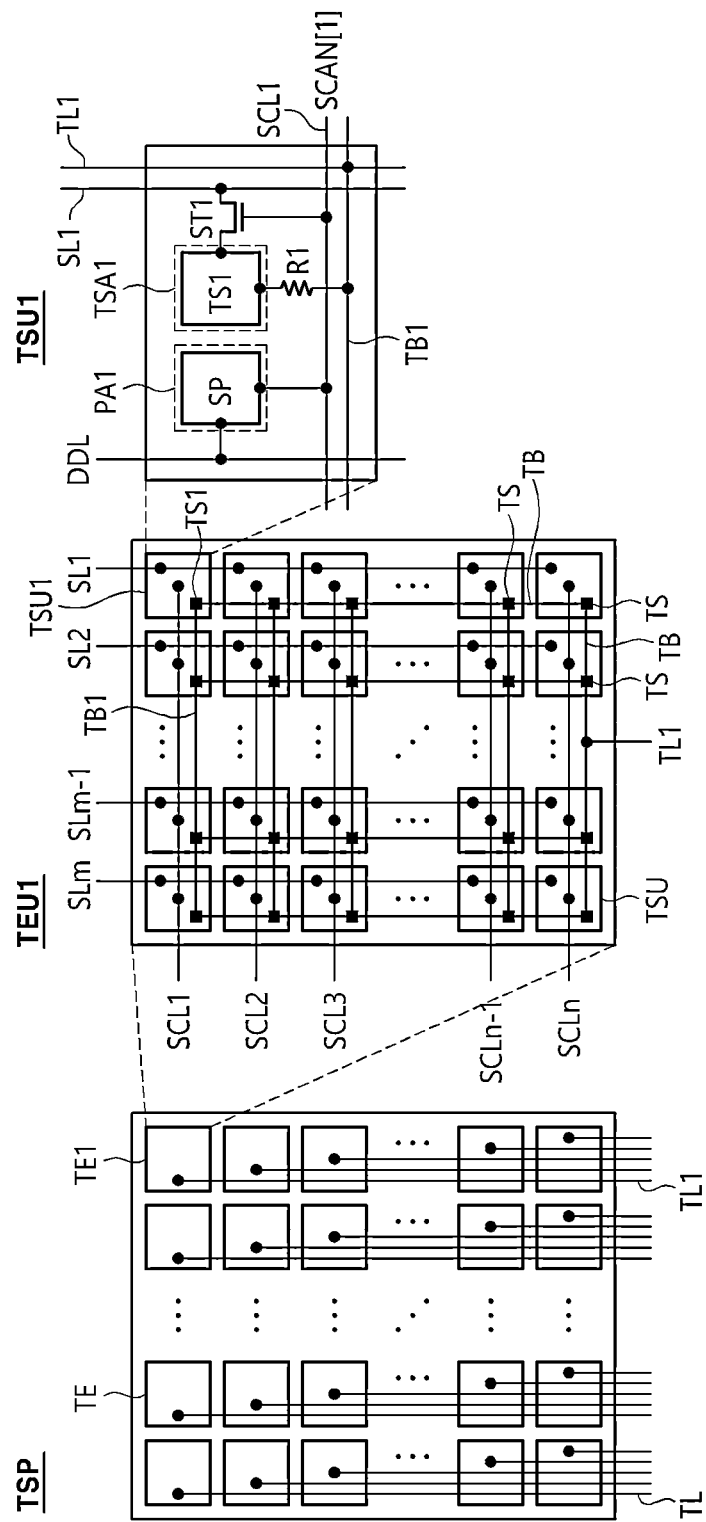
FIG. 7 illustrates a touch sensor configuration for compensating for a change in touch sensitivity according to a temperature change of a display panel in a touch display device according to embodiments of the present disclosure.

FIG. 7 illustrates a touch sensor configuration for compensating for a change in touch sensitivity according to a temperature change of a display panel 110 in a touch display device 100 according to embodiments of the present disclosure.

Referring to FIG. 7, a touch panel area TSP in the display panel 110 may include a plurality of touch electrodes TE and a plurality of touch lines TL. The plurality of touch lines TL may be respectively connected to the plurality of touch electrodes TE.

The plurality of touch electrodes TE may include a first touch electrode TE1, and the plurality of touch lines TL may include a first touch line TL1 connected to the first touch electrode TE1.

Referring to FIG. 7, each of the plurality of touch electrodes TE may not be a single plate-shaped electrode, but may be composed of a plurality of touch sensors TS connected by a touch bridge TB. The configuration of each of the plurality of touch electrodes TE will be described using the first touch electrode TE1 as an example.

Referring to FIG. 7, a first touch electrode unit area TEU1 where the first touch electrode TE1 is formed may include touch sensors TS arranged in n rows and m columns. That is, the first touch electrode unit area TEU1 where the first touch electrode TEL is formed may include (n×m) touch sensors TS.

The first touch electrode unit area TEU1 may include touch bridges TB which electrically connect all (n×m) touch sensors TS.

The touch bridges TB included in the first touch electrode unit area TEU1 may include a row-direction touch bridge TB connecting touch sensors TS arranged in the same row and a column-direction touch bridge TB connecting touch sensors TS arranged in the same column.

Referring to FIG. 7, the (n×m) touch sensors TS included in the first touch electrode unit area TEU1 may include a first touch sensor TS1.

The touch bridges TB included in the first touch electrode unit area TEU1 may include a first touch bridge TB1 which connects the first touch sensor TS1 to another touch sensor TS adjacent in the row direction.

Referring to FIG. 7, the first touch electrode unit area TEU1 may include (n×m) touch sensor unit areas TSU. The (n×m) touch sensor unit areas TSU may be areas which each corresponds to (n×m) touch sensors TS, respectively.

In order to explain the structure of each of the (n×m) touch sensor unit areas TSU, there is exemplified the first touch sensor unit area TSU1 where the first touch sensor TS1 is located.

Referring to FIG. 7, the first touch sensor unit area TSU1 may include a first pixel area PA1 where at least one first subpixel SP is disposed and a first touch sensor area TSA1 where the first touch sensor TS1 is disposed.

The first touch sensor area TSA1 may be located on one side of the first pixel area PA1.

The first subpixel SP disposed in the first pixel area PA1 may include a light emitting device ED and a scanning transistor SCT, etc. Also, the first subpixel SP disposed in the first pixel area PA1 may further include a driving transistor DRT, and one capacitor Cst. The first subpixel SP may be configured as shown in FIG. 2.

Referring to FIG. 7, a first display driving line DDL may be disposed across the first touch sensor unit area TSU1. The first display driving line DDL may be connected to the first subpixel SP1. Also, a first scanning gate line SCL1 may be electrically connected to the first subpixel SP1.

Referring to FIG. 7, a first touch line TL1 may be disposed across the first touch sensor unit area TSU1. The first touch line TL1 may be electrically connected to the first touch sensor TS1. The first touch line TL1 may be connected to the touch driving circuit 160.

Referring to FIG. 7, a touch display device 100 according to embodiments of the present disclosure may further include a first sensing line SL1 disposed adjacent to the first touch sensor TS1, and a first sensing transistor ST1 for controlling an electrical connection between the first sensing line SL1 and the first touch sensor TS1.

Referring to FIG. 7, the first sensing line SL1 may be disposed across the first touch sensor unit area TSU1, and the first sensing transistor ST1 may be disposed within the first touch sensor unit area TSU1.

Referring to FIG. 7, the scanning gate lines may include a first scanning gate line SCL1, a second scanning gate line SCL2, and a nth scanning gate line SCLn.

Referring to FIG. 7, a first scanning gate line SCL1 may be electrically connected to a gate node of the scanning transistor SCT within the first subpixel SP. The first scanning gate line SCL1 may supply a first scanning gate signal SCAN[1] to the gate node of the scanning transistor SCT within the first subpixel SP. The scanning transistor SCT within the first subpixel SP may be turned on or off in response to the first scanning gate signal SCAN[1] supplied from the first scanning gate line SCL1.

Referring to FIG. 7, the first scanning gate line SCL1 may be electrically connected to a gate node of the first sensing transistor ST1 within the first touch sensor unit area TSU1. The first sensing transistor ST1 within the first touch sensor unit area TSU1 may be turned on or off in response to the first scanning gate signal SCAN[1] supplied from the first scanning gate line SCL1.

Accordingly, the first scanning gate line SCL1 may simultaneously supply the first scanning gate signal SCAN[1] for simultaneously controlling the on-off of the first sensing transistor ST1 and a scanning transistor SCT in the first subpixel SP to the scanning transistor SCT and the first sensing transistor ST1.

Therefore, the first sensing transistor ST1 and the scanning transistor SCT in the first subpixel SP may be simultaneously turned on or simultaneously turned off in response to the first scanning gate signal SCAN[1], without being limited thereto.

While the scanning transistor SCT in the first subpixel SP is turned on, the first sensing transistor ST1 may also be turned on, so that the first touch sensor TS1 and the first sensing line SL1 may be electrically connected.

That is, when the first touch sensor TS1 and the first sensing line SL1 are connected, the scanning transistor SCT in the first subpixel SP may be turned on. Also, the first sensing transistor ST1 may also be turned on.

While the scanning transistor SCT in the first subpixel SP is turned off, the first sensing transistor ST1 may also be turned off, so that the first touch sensor TS1 and the first sensing line SL1 may be electrically separated.

That is, when the first touch sensor TS1 and the first sensing line SL1 are not connected, the scanning transistor SCT in the first subpixel SP may be turned off. Also, the first sensing transistor ST1 may also be turned off.

Referring to FIG. 7, the touch display device 100 according to the embodiments of the present disclosure may further include a first touch bridge TB1 for electrical connection between the first touch sensor TS1 and the first touch line TL1.

Referring to FIG. 7, a first resistance pattern R1 may be connected between the first touch line TL1 and the first touch sensor TS1.

The first resistance pattern R1 may be a resistance connected between the first touch bridge TB1 and the first touch sensor TS1. Alternatively, the first resistance pattern R1 may be a resistance connected between an extension of the first touch bridge TB1 and the first touch sensor TS1. Alternatively, the first resistance pattern R1 may be a resistance existing in the first touch bridge TB1, or may be a resistance component of the first touch bridge TB1 or its extension.

Referring to FIG. 7, the display panel 110 may further include one or more display common electrodes corresponding to the second electrode E2 of the light emitting device ED of the first subpixel SP.

If the display panel 110 includes one display common electrode, the display common electrode may be disposed in the entire area of the display panel 110, and may be a single, undivided metal.

In contrast, if the display panel 110 includes a plurality of display common electrodes, each of the plurality of display common electrodes may be disposed only in a pixel area within each touch sensor unit area TSU. For example, one display common electrode may be disposed in the first pixel area PA1 within the first touch sensor unit area TSU1. For example, one display common electrode may be disposed in the second pixel area PA2 within the second touch sensor unit area TSU2.

Referring to FIG. 7, the first display driving line DDL may be various signal lines for display driving.

For example, the first display driving line DDL may include at least one of a data line DL for supplying a data voltage Vdata to the first subpixel SP, a first driving power line DVL for supplying a first driving power signal EVDD to the first subpixel SP, a second driving power line VSL for supplying a second driving power signal EVSS to the first subpixel SP, or a reference voltage line for supplying a reference voltage to the first subpixel SP.

For example, if the first display driving line DDL is the second driving power line VSL, it may be the second driving power line VSL capable of being connected to the second electrode E2 of the light emitting device ED so as to supply a second driving power signal EVSS to the second electrode E2.

In this case, the first display driving line DDL, which is the second driving power line VSL, may be electrically connected to the second electrode E2 of the light emitting device ED so as to supply the second driving power signal EVSS to the second electrode E2.

The first touch sensor TS1 disposed in the first touch sensor area TSA1 may include the same material as the display common electrode. For example, during the panel manufacturing process, the display common electrodes (e.g., the second electrodes E2) and the touch sensors TS may be formed in a separate form through patterning processing on the display common electrode material (e.g., cathode electrode material).

Meanwhile, referring to FIG. 7, within the first touch sensor unit area TSU1, the first pixel area PA1 may be a non-transmission area (also referred to as a non-transparent area) through which light is not transmitted, and the first touch sensor area TSA1 may be a transmission area (also referred to as a transparent area) through which light is transmitted. Accordingly, the first touch sensor TS1 may be composed of a transparent electrode material. In addition, the display common electrode disposed in the first pixel area PA1 may be composed of the same transparent electrode material as the first touch sensor TS1. Here, the transmission area TA may mean an area through which external light is transmitted so that the background can be recognized from the front.

Figure 8:
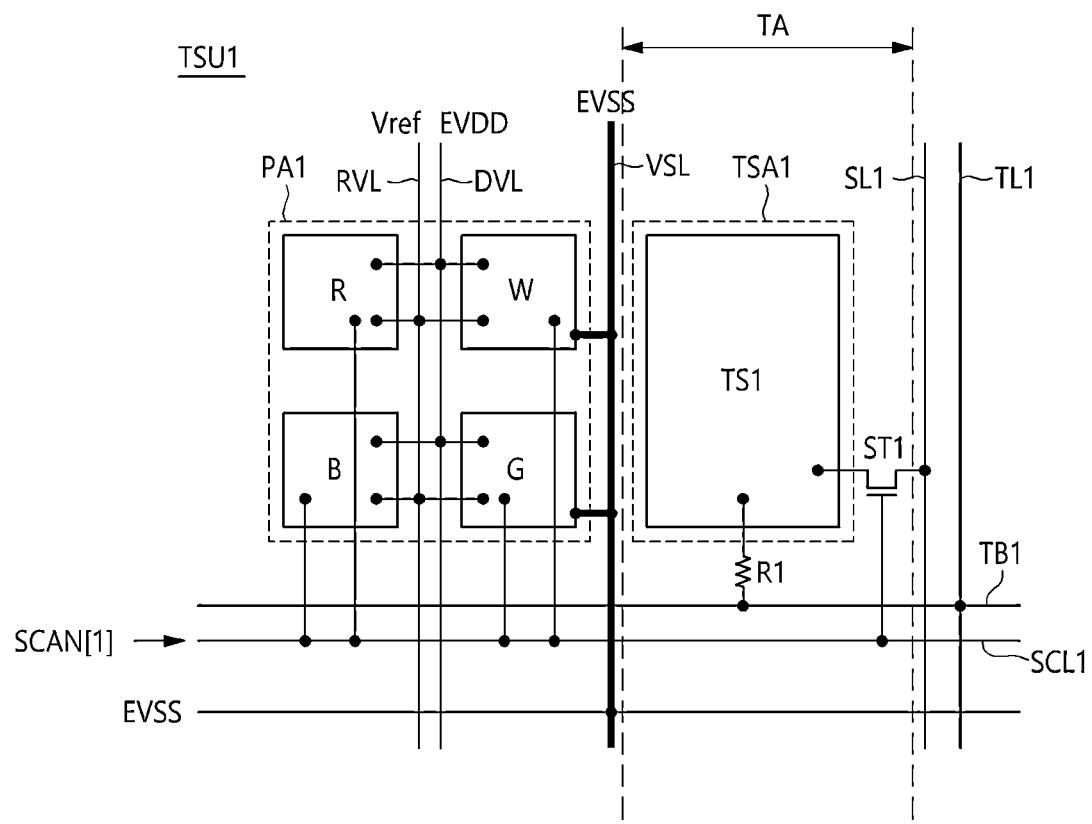
FIG. 8 illustrates a first touch sensor unit area of FIG. 7 in more detail according to embodiments of the present disclosure.

FIG. 8 illustrates a first touch sensor unit area TSU1 of FIG. 7 in more detail.

The structure of the first touch sensor unit area TSU1 of FIG. 8 is a more detailed example of the structure of the first touch sensor unit area TSU1 of FIG. 7. Therefore, in the following, when describing the structure of the first touch sensor unit area TSU1 of FIG. 8, it will be mainly described the differences from the structure of the first touch sensor unit area TSU1 of FIG. 7.

Referring to FIG. 8, three first display driving lines DDL including a first driving power line DVL, a second driving power line VSL, and a reference voltage line RVL may be disposed in the column direction.

A plurality of subpixels may be disposed in the first pixel area PA1. The plurality of subpixels can include Red subpixel, Green subpixel, and Blue subpixel, but is not limited thereto. Referring to FIG. 8, for example, four subpixels R, W, B and G may be disposed in the first pixel area PA1. For example, four subpixels R, W, B and G may include a red subpixel Remitting red light, a white subpixel W emitting white light, a blue subpixel B emitting blue light, and a green subpixel G emitting green light. As an example, the subpixel of other colors such as magenta, cyan, or yellow may be alternatively or additionally included, without being limited thereto.

For example, in the first pixel area PA1, the four subpixels R, W, B and G may be arranged in two rows and two columns.

Referring to FIG. 8, the reference voltage line RVL and the first driving power line DVL may be arranged in the column direction. Referring to FIG. 8, the reference voltage line RVL and the first driving power line DVL may be disposed across the first pixel area PA1.

Referring to FIG. 8, the second driving power line VSL may be located between the first pixel area PA1 and the first touch sensor area TSA1, and may be arranged in the column direction. An auxiliary line connected to the second driving power line VSL may be arranged in the row direction.

Referring to FIG. 8, the transmission area TA may be an area between the second driving power line VSL and the first sensing line SL1. The transmission area TA may include a first touch sensor area TSA1 in which the first touch sensor TS1 is disposed, and the transmission area TA may further include at least one of the first sensing transistor, the first touch bridge TB1, and the first scanning gate line SCL1.

The transmission area may be an area between the second driving power line VSL and the first sensing line SL1 excluding at least one of the first sensing transistor, the first touch bridge TB1, and the first scanning gate line SCL1. The first touch sensor TS1 may be formed of a transparent electrode material. In addition, one display common electrode disposed in the first pixel area PA1 may be formed of the same transparent electrode material as the first touch sensor TS1. For example, the non-transmission area may be an area where transistors related to the subpixels R, W, B and G in the first pixel area PA1 are disposed. The transmission area TA may mean an area outside the non-transmission area and having a higher transmittance than the non-transmission area. The transmission area TA may be an area where transistors related to the subpixels R, W, B and G in the first pixel area PA1 are not disposed. The transmission area TA may include the first touch sensor area TSA1 where the first touch sensor TS1 is disposed. The non-transmission area may include an area where the display common electrode is disposed, and the transmission area TA may include an area where the display common electrode is not disposed. The transmission area TA described herein may also be referred to as a transparent area. The non-transmission area described herein may also be referred to as a non-transparent area.

As described above, the temperature change of the display panel 110 may occur due to the touch of a touch pointer (e.g., a finger, a pen) which is higher than the surface temperature of the display panel 110, or an image change may occur, thereby causing an undesired parasitic capacitance change ΔCp in the touch electrode TE, which may deteriorate the touch sensitivity. That is, the touch sensitivity may be reduced not only by finger touch but also by image change.

In the embodiments of the present disclosure, the image change may have an effect equivalent to the temperature change of the display panel 110. Therefore, even if it is described that the temperature change of the display panel 110 due to the touch of a touch pointer (e.g., a finger, a pen) having a temperature higher than the surface temperature of the display panel 110, for convenience of explanation, the temperature change of the display panel 110 should be considered as a concept including the image change. Also, even if it is described that the temperature change of the display panel 110 due to the image change, for convenience of explanation, the temperature change of the display panel 110 should be considered as a concept including the touch of a touch pointer (e.g., a finger, a pen) having a temperature higher than the surface temperature of the display panel 110. Here, the image change may mean a change in the gradation of the image. In addition, the touch pointer may include a finger and a pen, but hereinafter, for convenience of explanation, a finger will be used as an example.

The touch display device 100 according to embodiments of the present disclosure may include a temperature sensing structure to compensate for a decrease in touch sensitivity due to a temperature change of a display panel 110 caused by a finger touch.

The temperature sensing structure included in the touch display device 100 according to the embodiments of the present disclosure may be included in each of a plurality of touch sensor unit areas TSU.

Referring to FIGS. 7 and 8, the temperature sensing structure related to the first touch sensor unit area TSU1 may include a first sensing transistor ST1, a first resistance pattern R1, a first sensing line SL1, a first touch sensor TS1, and a first touch line TL1.

Hereinafter, it will be described a temperature sensing method utilizing the temperature sensing structure according to the embodiments of the present disclosure, and a touch sensitivity change compensation method based on temperature sensing.

Figure 9:
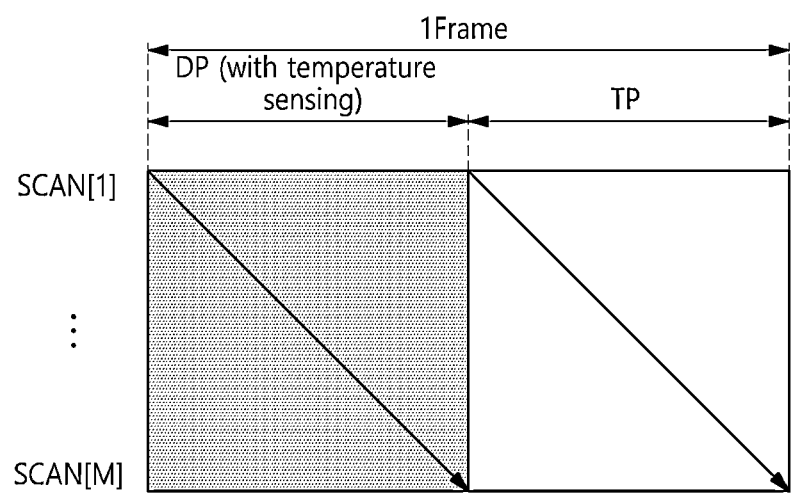
FIG. 9 illustrates the driving timing of a touch display device according to embodiments of the present disclosure.

FIG. 9 illustrates the driving timing of a touch display device 100 according to embodiments of the present disclosure. For example, the touch display device 100 according to the exemplary embodiments of the present disclosure may divide one frame time into one or more display period DP and one or more touch period TP.

Referring to FIG. 9, the touch display device 100 according to the embodiments of the present disclosure may divide one frame time into one display period DP and one touch period TP, perform display driving for image display (i.e., image update) during the display period DP, and perform touch driving for sensing a touch during the touch period TP.

Alternatively, the touch display device 100 according to the embodiments of the present disclosure may divide one frame time into a plurality of display periods DP and a plurality of touch periods TP, perform display driving for image display (i.e., image update) during each display period DP, and perform touch driving for sensing a touch during each touch period TP. In this case, the display period DP and the touch period TP may be alternated.

As illustrated in FIG. 7 and FIG. 8, within the first touch sensor unit area TSU1, the first scanning gate line SCL1 may be simultaneously connected to a gate node of the scanning transistor SCT of the first subpixel SP and a gate node of the first sensing transistor ST1.

Accordingly, in the first touch sensor unit area TSU1, the first scanning gate line SCL1 may simultaneously supply the first scanning gate signal SCAN[1] to the gate node of the scanning transistor SCT of the first subpixel SP and the gate node of the first sensing transistor ST1 for simultaneously controlling the on-off of the scanning transistor SCT and the first sensing transistor ST1.

Accordingly, within the first touch sensor unit area TSU1, the first sensing transistor ST1 and the scanning transistor SCT in the first subpixel SP may be simultaneously turned on or simultaneously turned off in response to the first scanning gate signal SCAN[1], without being limited thereto.

As described above, as illustrated in FIG. 9, the touch display device 100 according to embodiments of the present disclosure may simultaneously perform temperature sensing operations during a display period DP.

During the display period DP in which the data voltage for image display is supplied to the first subpixel SP in the first touch sensor unit area TSU1, the first sensing transistor ST1 in the first touch sensor unit area TSU1 may be turned on.

That is, during the period in which the first sensing transistor ST1 in the first touch sensor unit area TSU1 is turned on, that is, during the period in which the temperature sensing operation is performed, the data voltage Vdata for image display may be supplied to the first subpixel SP. At this time, the scanning transistor SCT of the first subpixel SP in the first touch sensor unit area TSU1 may be turned on.

During the touch period TP, the first sensing transistor ST1 in the first touch sensor unit area TSU1 may be turned off. At this time, the scanning transistor SCT of the first subpixel SP in the first touch sensor unit area TSU1 may be turned off.

The touch display device 100 according to the embodiments of the present disclosure may perform temperature sensing processing for each of a plurality of touch sensor unit areas TSU included in each of a plurality of touch electrode unit areas TEU.

Hereinafter, it will be described temperature sensing processing for the first touch sensor unit area TSU1 within the first touch electrode unit area TEU1 as an example.

The first sensing transistor ST1 may have a characteristic in which the mobility changes according to a temperature change. The temperature change in the first touch sensor unit area TSU1 may be detected by utilizing this characteristic.

The touch display device 100 according to the embodiments of the present disclosure may measure the current flowing through the first sensing transistor ST1 and sense the temperature based on the measured current. If the mobility of the first sensing transistor ST1 increases, there may increase an amount of current flowing through the first sensing transistor ST1. Also, if the mobility of the first sensing transistor ST1 decreases, the amount of current flowing in the first sensing line SL1 per unit time may decrease.

The temperature sensing of the touch display device 100 according to the embodiments of the present disclosure may be performed according to two driving methods. Depending on the two driving methods, a line through which the current sensing for temperature sensing is performed may be different, and the driving methods for each of the first sensing line SL1 and the first touch line TL1 may be different.

The two driving methods may include a first driving method in which the first sensing line SL1 becomes a current sensing path and a second driving method in which the first touch line TL1 becomes a current sensing path. Hereinafter, the first driving method will be described in detail first, and then the second driving method will be described in detail.

Figure 10:
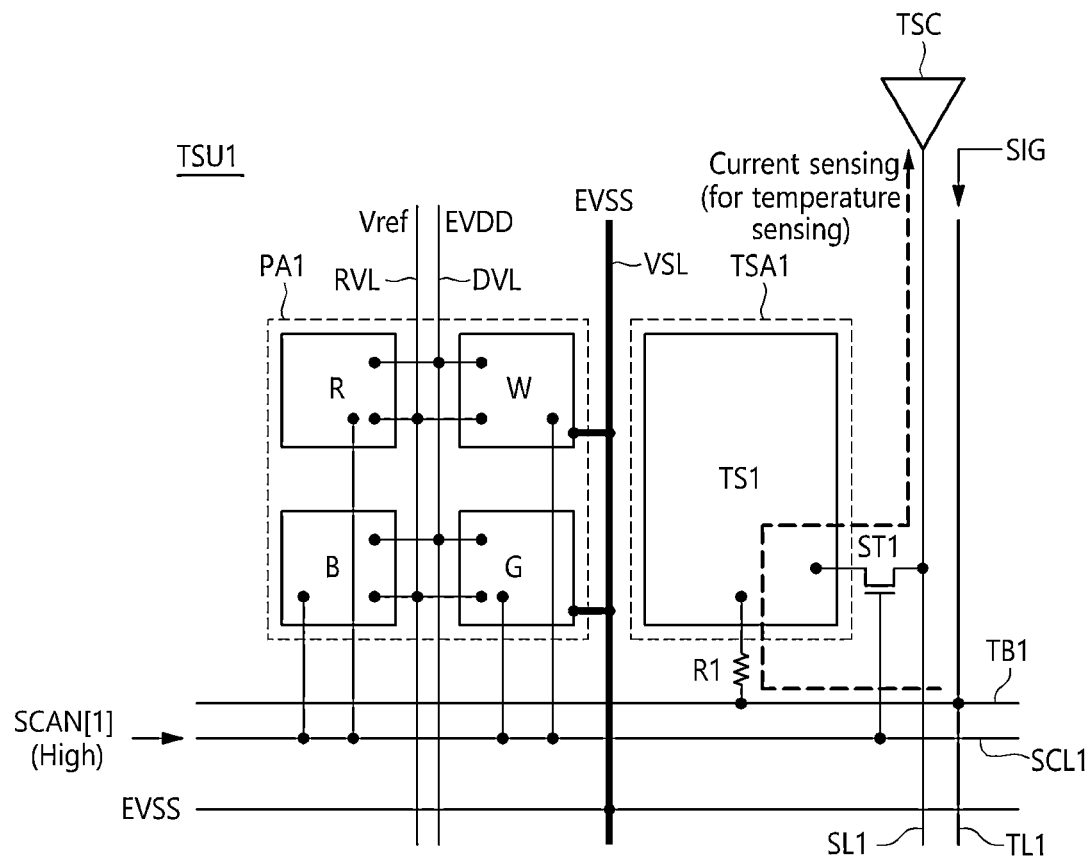
FIG. 10 illustrates a first touch sensor unit area during a display period in which temperature sensing is performed in a touch display device according to embodiments of the present disclosure.

FIG. 10 illustrates a first touch sensor unit area TSU1 during a display period DP in which temperature sensing is performed in a touch display device 100 according to embodiments of the present disclosure.

Referring to FIG. 10, the touch display device 100 according to the embodiments of the present disclosure may further include a current sensing circuit TSC connected to the first sensing line SL1 in order to sense the current flowing in the first sensing line SL1.

Referring to FIG. 10, during the display period DP, a first scanning gate signal SCAN[1] may have a turn-on level voltage (e.g., high) for a specific period of time (e.g., one horizontal time or two horizontal times, etc.). Here, as illustrated in FIG. 10, if the first sensing transistor ST1 is an n-type transistor, the turn-on level voltage of the first scanning gate signal SCAN[1] may be a high level voltage. If the first sensing transistor ST1 is a p-type transistor, the turn-on level voltage of the first scanning gate signal SCAN[1] may be a low level voltage. Also, if the scanning transistor SCT in the subpixel is an n-type transistor, the turn-on level voltage of the first scanning gate signal SCAN[1] may be a high level voltage. If the scanning transistor SCT in the subpixel is a p-type transistor, the turn-on level voltage of the first scanning gate signal SCAN[1] may be a low level voltage.

Referring to FIG. 10, during the display period DP, if the first scanning gate signal SCAN[1] has a turn-on level voltage, the first sensing transistor ST1 may be turned on. In addition, the scanning transistors SCT in the subpixels R, W, B and G in the first pixel area PA1 may also be turned on.

Referring to FIG. 10, as the first sensing transistor ST1 is turned on, the first touch sensor TS1 and the first sensing line SL1 may be electrically connected through the first sensing transistor ST1.

The temperature sensing may be performed during the entire display period DP. Alternatively, the temperature sensing may be performed during a part of the display period DP.

Referring to FIG. 10, during the display period DP, a test signal SIG for temperature sensing may be supplied to the first touch line TL1. For example, the test signal SIG may be a voltage having a constant first voltage level or a voltage having a variable voltage level.

Referring to FIG. 10, when the test signal SIG is supplied, no signal may be applied to the first sensing line SL1 or a voltage having a constant second voltage level may be applied to the first sensing line SL1. Here, the second voltage level may be different from the first voltage level.

During the display period DP, as the first sensing transistor ST1 is turned on, the first touch sensor TS1 and the first sensing line SL1 may be electrically connected. In addition, as the test signal SIG is applied to the first touch line TL1 connected to the first touch sensor TS1, current may flow to the first sensing line SL1. Here, the path through which the current flows may be formed by the first touch line TL1, the first touch bridge TB1, the first touch sensor TS1, the first sensing transistor ST1, and the first sensing line SL1.

Referring to FIG. 10, during the display period DP, the current sensing circuit TSC connected to the first sensing line SL1 may sense the current flowing in the first sensing line SL1. For example, the current sensing circuit TSC may include an analog-to-digital converter. The analog-to-digital converter may convert a voltage corresponding to a current flowing in the first sensing line SL1 into a digital value and output the digital value as a current sensing value.

That is, during the display period DP, the first scanning gate signal SCAN[1] may be supplied to the first sensing transistor ST1, the first sensing transistor ST1 may be turned on. During the period in which the first sensing transistor ST1 is turned on, the touch driving circuit 160 may supply a test signal SIG to the first touch line TL1, and the current sensing circuit TSC may sense a current flowing in the first sensing line SL1.

During the display period DP, the first scanning gate signal SCAN[1] may be simultaneously supplied to the gate node of the scanning transistor SCT included in each of the subpixels R, W, B and G disposed in the first pixel area PA1 within the first touch sensor unit area TSU1. Accordingly, the scanning transistor SCT included in each of the subpixels R, W, B and G may be turned on.

Accordingly, during the display period DP, when current sensing is performed through the first sensing transistor ST1 within the first touch sensor unit area TSU1, display driving may be performed for the subpixels R, W, B and G disposed in the first pixel area PA1 within the first touch sensor unit area TSU1. Here, the display driving may include supplying a data voltage Vdata for image display to the subpixels R, W, B and G.

During the display period DP, as the temperature of the first touch sensor area TSA1 increases, the mobility of the first sensing transistor ST1 may also increase, and accordingly, there may increase the amount of current flowing in the first sensing line SL1 per unit time.

During the display period DP, as the temperature of the first touch sensor area TSA1 decreases, the mobility of the first sensing transistor ST1 may decrease, and accordingly, the amount of current flowing in the first sensing line SL1 per unit time may decrease.

In order to increase the accuracy of temperature sensing, the first sensing transistor ST1 may be a transistor having a characteristic of a large change in mobility with respect to a temperature change. That is, the first sensing transistor ST1 may be a transistor having a characteristic change sensitive to a temperature change. The temperature change in the first touch sensor unit area TSU1 may be detected by utilizing this characteristic.

For example, the first sensing transistor ST1 may be an oxide transistor whose active layer is composed of an oxide semiconductor material.

During the display period DP, if a touch occurs by a finger in the first touch sensor area TSA1 or around the first touch sensor area TSA1, or if the gradation of an image displayed in relation to the first pixel area PA1 increases, there may increase the amount of current flowing in the first sensing line SL1.

During the display period DP, as the amount of current flowing in the first sensing line SL1 per unit time changes, the touch sensing value obtained during the touch period TP after the display period DP may change.

Figure 11:
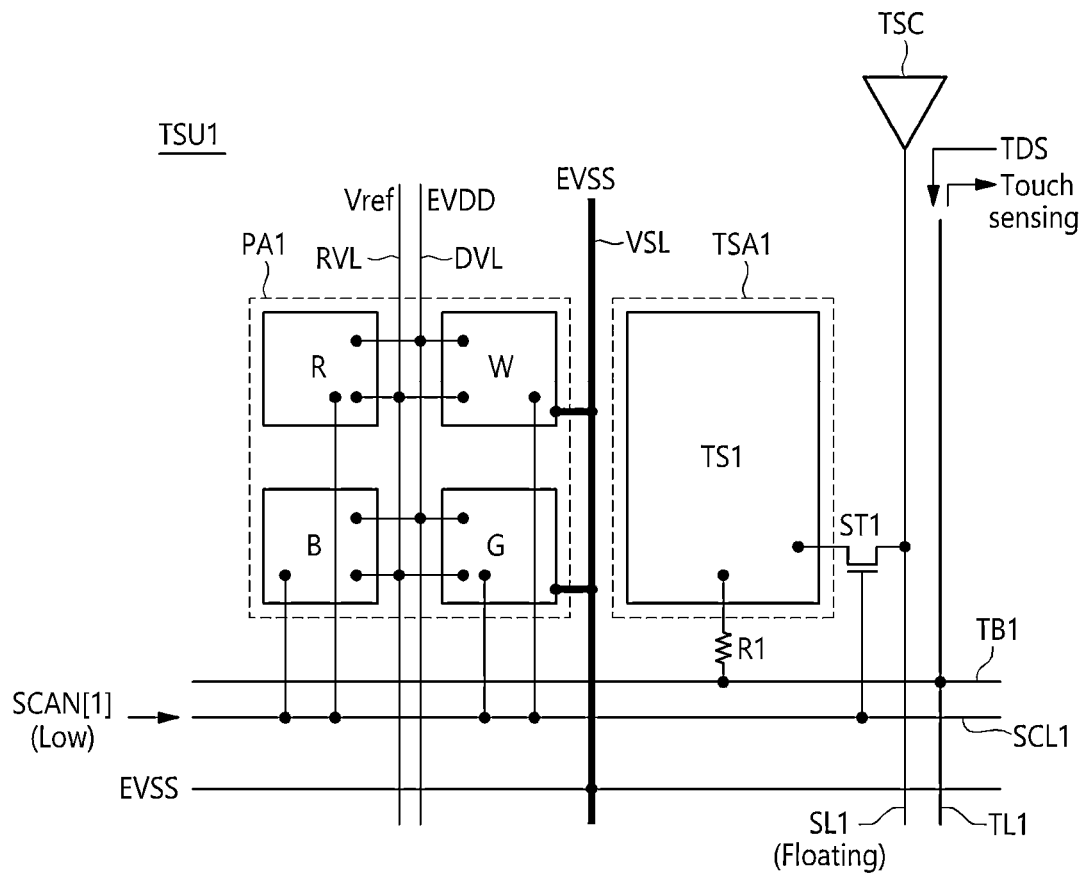
FIG. 11 illustrates a first touch sensor unit area during a touch period in a touch display device according to embodiments of the present disclosure.

FIG. 11 illustrates a first touch sensor unit area TSU1 during a touch period TP in a touch display device 100 according to embodiments of the present disclosure.

Referring to FIG. 11, during the touch period TP for sensing a touch, the first scanning gate signal SCAN[1] may have a turn-off level voltage (e.g., low). Here, as illustrated in FIG. 11, if the first sensing transistor ST1 is an n-type transistor, the turn-off level voltage of the first scanning gate signal SCAN[1] may be a low level voltage. If the first sensing transistor ST1 is a p-type transistor, the turn-on level voltage of the first scanning gate signal SCAN[1] may be a high level voltage.

Referring to FIG. 11, during the touch period TP for sensing a touch, since the first scanning gate signal SCAN[1] has a turn-off level voltage, the first sensing transistor ST1 may be turned off, and the scanning transistors SCT included in the subpixels R, W, B and B within the first pixel area PA1 may also be turned off.

Referring to FIG. 11, during the touch period TP, as the first sensing transistor ST1 is turned off, the first touch sensor TS1 and the first sensing line SL1 may be electrically separated through the first sensing transistor ST1.

During the touch period TP, a touch driving signal TDS having a variable voltage level may be supplied to the first touch line TL1.

During the touch period TP, the touch driving circuit 160 may supply a touch driving signal TDS to the first touch sensor TS1 through the first touch line TL1.

During the touch period TP, since the first touch sensor TS1 and the first sensing line SL1 are electrically separated by the turn-off of the first sensing transistor ST1, the touch driving signal TDS supplied to the first touch sensor TS1 is not transmitted to the first sensing line SL1.

During the touch period TP, the touch driving circuit 160 may sense the capacitance (e.g., self-capacitance) in the first touch sensor TS1 through the first touch line TL1 after outputting the touch driving signal TDS to the first touch line TL1.

During the touch period TP, since the first sensing transistor ST1 is in a turn-off state, the first sensing line SL1 may be electrically separated from the first touch sensor TS1, and may be in an electrically floating state. Therefore, during the touch period TP, current may not flow to the first sensing line SL1. Accordingly, the first sensing line SL1 does not affect touch sensing.

Figure 12:
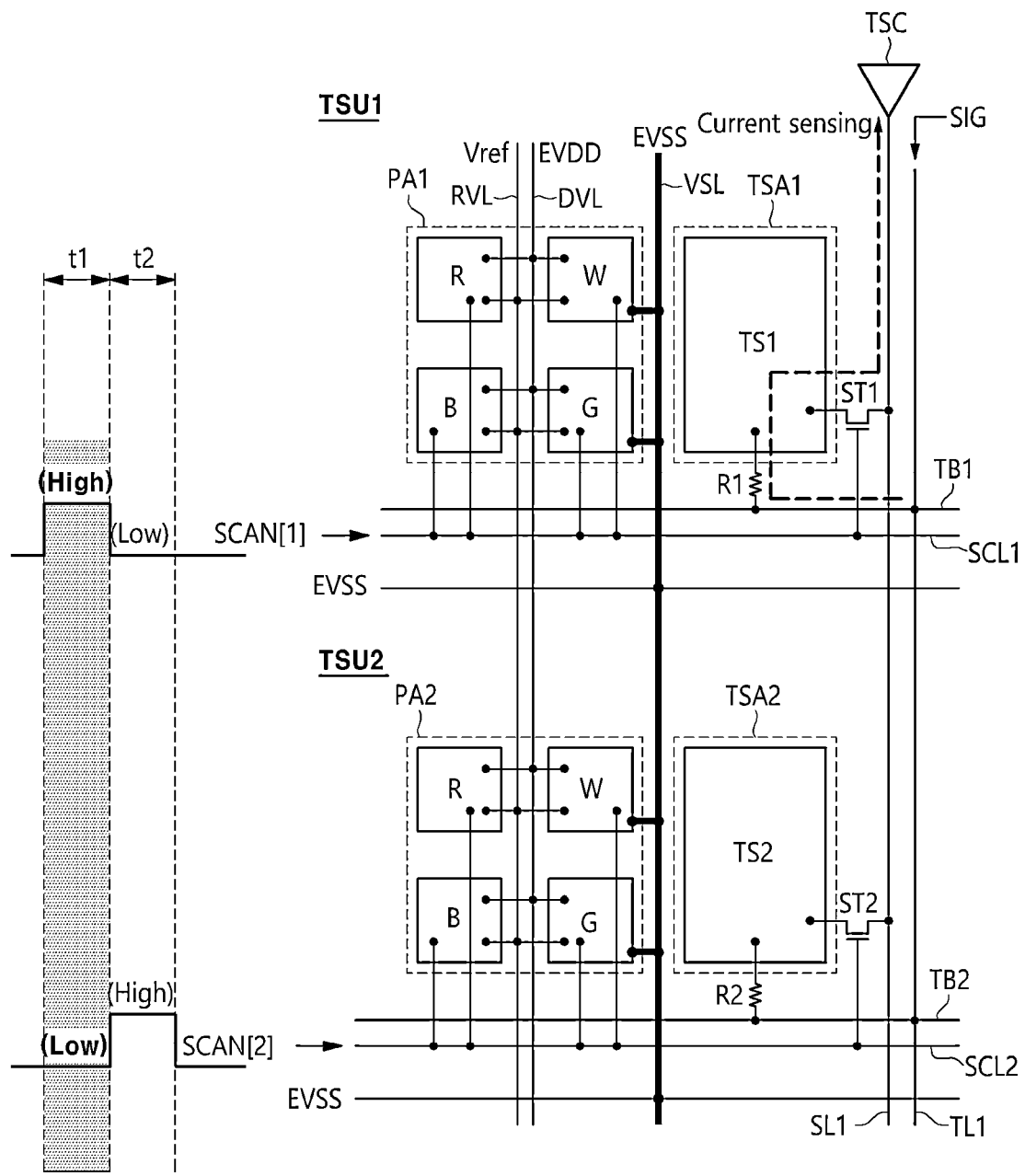
FIG. 12 illustrates two touch sensor unit areas during a display period in which temperature sensing is performed in a touch display device according to embodiments of the present disclosure.

FIG. 12 illustrates two touch sensor unit areas TSU1 and TSU2 during a display period DP in which temperature sensing is performed in a touch display device 100 according to embodiments of the present disclosure.

Referring to FIG. 12, the touch display device 100 may include a plurality of touch sensor unit areas, such as a first touch sensor unit area TSU1 and a second touch sensor unit area TSU2.

The first touch sensor unit area TSU1 may include a first pixel area PA1 and a first touch sensor area TSA1. First subpixels R, W, B and G may be disposed in the first pixel area PA1, and a first touch sensor TS1 may be disposed in the first touch sensor area TSA1. The first touch sensor area TSA1 may be located on one side of the first pixel area PA1. The first subpixels R, W, B and G may be configured as shown in FIG. 2.

The second touch sensor unit area TSU2 may include a second pixel area PA2 and a second touch sensor area TSA2. Second subpixels R, W, B and G may be disposed in the second pixel area PA2, and a second touch sensor TS2 may be disposed in the second touch sensor area TSA2. The second touch sensor area TSA2 may be located on one side of the second pixel area PA2. The second subpixels R, W, B and G may be configured as shown in FIG. 2.

The second touch sensor unit area TSU2 may be adjacent to the first touch sensor unit area TSU1 in the column direction. The second pixel area PA2 may be adjacent to the first pixel area PA1 in the column direction. The second touch sensor area TSA2 may be adjacent to the first touch sensor area TSA1 in the column direction. The first pixel area PA1 may be adjacent to the first touch sensor area TSA1 in the row direction. The second pixel area PA2 may be adjacent to the second touch sensor area TSA2 in the row direction.

A first driving power line DVL, a second driving power line VSL, and a reference voltage line RVL may be disposed in the column direction. The first driving power line DVL, the second driving power line VSL, and the reference voltage line RVL may be arranged across the first touch sensor unit area TSU1 and the second touch sensor unit area TSU2.

A first scanning gate line SCL1 and a second scanning gate line SCL2 may be disposed in the row direction. A first scanning gate line SCL1 may be disposed in the first touch sensor unit area TSU1, and a second scanning gate line SCL2 may be disposed in the second touch sensor unit area TSU2.

The first scanning gate line SCL1 may supply a first scanning gate signal SCAN[1] to a scanning transistor SCT within a first subpixel R, W, B and G included in a first pixel area PA1 within the first touch sensor unit area TSU1. The scanning transistor SCT within a first subpixel R, W, B and G included in a first pixel area PA1 within the first touch sensor unit area TSU1 may be turned on or off in response to the first scanning gate signal SCAN[1].

The second scanning gate line SCL2 may supply a second scanning gate signal SCAN[2] to a scanning transistor SCT in the second subpixel R, W, B and G included in the second pixel area PA2 in the second touch sensor unit area TSU2. The scanning transistor SCT in the second subpixel R, W, B and G included in the second pixel area PA2 in the second touch sensor unit area TSU2 may be turned on or off in response to the second scanning gate signal SCAN[2].

A first touch line TL1 and a first sensing line SL1 may be arranged in the column direction.

In the first touch sensor unit area TSU1, a first touch bridge TB1 connecting the first touch line TL1 and the first touch sensor TS1 may be disposed.

In the first touch sensor unit area TSU1, a first resistance pattern R1 connected between the first touch sensor TS1 and the first touch bridge TB1 may be disposed.

In the second touch sensor unit area TSU2, a second touch bridge TB2 connecting the first touch line TL1 and the second touch sensor TS2 may be disposed.

In the second touch sensor unit area TSU2, a second resistance pattern R2) connected between the second touch sensor TS2 and the second touch bridge TB2 may be disposed.

In the first touch sensor unit area TSU1, a first sensing transistor ST1 controlling the electrical connection between the first sensing line SL1 and the first touch sensor TS1 may be disposed.

In the second touch sensor unit area TSU2, a second sensing transistor ST2 controlling the electrical connection between the first sensing line SL1 and the second touch sensor TS2 may be disposed.

During the display period DP, a test signal SIG may be supplied to the first touch line TL1.

FIG. 12 illustrates two touch sensor unit areas during a display period in which temperature sensing is performed in a touch display device according to exemplary embodiments of the present disclosure.

Referring to FIG. 12, during a first time t1 included in the display period DP, the first scanning gate signal SCAN[1] may have a turn-on level voltage (e.g., High), and the second scanning gate signal SCAN[2] may have a turn-off level voltage (e.g., Low).

Therefore, during the first time t1, the first sensing transistor ST1 may be turned on in response to the first scanning gate signal SCAN[1] and the second sensing transistor ST2 may be turned off in response to the second scanning gate signal SCAN[2].

During the first time t1, the current sensing circuit TSC may sense the current flowing along the first current flow path, and may generate a current sensing value for the first touch sensor unit area TSU1 based on the current sensing result and supply the current sensing value to the touch controller 170.

During the first time t1, the touch controller 170 may compensate a touch sensing value based on the current sensing value for the first touch sensor unit area TSU1.

Referring to FIG. 12, the display period DP may include a first time t1 and a second time t2.

Referring to FIG. 12, during the second time t2 proceeding after the first time t1, the first scanning gate signal SCAN[1] may have a turn-off level voltage (e.g., Low), and the second scanning gate signal SCAN[2] may have a turn-on level voltage (e.g., High).

Therefore, during the second time t2, the first sensing transistor ST1 may be turned off in response to the first scanning gate signal SCAN[1], and the second sensing transistor ST2 may be turned on in response to the second scanning gate signal SCAN[2].

During the second time t2, the current sensing circuit TSC may sense current, and may generate a current sensing value for the second touch sensor unit area TSU2 based on the current sensing result, and supply the current sensing value to the touch controller 170.

During the second time t2, the touch controller (170) may compensate a touch sensing value based on the current sensing value for the second touch sensor unit area TSU2.

Figure 13:
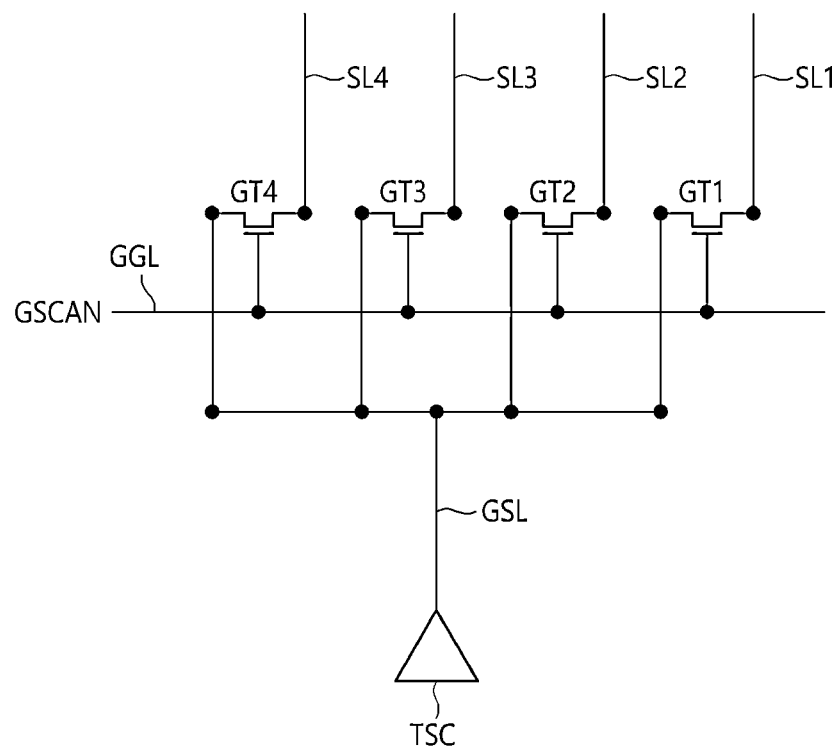
FIG. 13 illustrates a structure for performing temperature sensing for a plurality of touch sensors simultaneously in a touch display device according to embodiments of the present disclosure.

FIG. 13 illustrates a structure for performing temperature sensing for a plurality of touch sensors simultaneously in a touch display device 100 according to embodiments of the present disclosure.

Referring to FIG. 13, the touch display device 100 according to the embodiments of the present disclosure may simultaneously perform current sensing for temperature sensing in a plurality of touch sensor unit areas TSU.

To this end, the touch display device 100 according to the embodiments of the present disclosure may simultaneously sense the temperature for two or more touch sensor unit areas TSU by sensing two or more sensing lines SL1, SL2, SL3 and SLA by grouping two or more sensing lines into one sensing line group. This sensing method may be referred to as a group sensing.

A group sensing structure of the touch display device 100 according to the embodiments of the present disclosure may include two or more grouping transistors GT1, GT2, GT3 and GT4, a grouping gate line GGL, and a group sensing line GSL.

Two or more grouping transistors GT1, GT2, GT3 and GT4 may correspond to two or more sensing lines SL1, SL2, SL3 and SL4, respectively.

The grouping gate line GGL may be connected to gate nodes of two or more grouping transistors GT1, GT2, GT3 and GT4 simultaneously.

Two or more grouping transistors GT1, GT2, GT3 and GT4 may be turned on or off simultaneously by a grouping scanning signal GSCAN supplied from the grouping gate line GGL.

If two or more grouping transistors GT1, GT2, GT3 and GT4 are turned on at the same time in response to the grouping scanning signal GSCAN supplied from the grouping gate line GGL, two or more sensing lines SL1, SL2, SL3 and SL4 may be electrically connected to one grouping gate line GGL at the same time.

Currents flowing in two or more sensing lines (SL1, SL2, SL3 and SL4 may be combined and flow to one grouping gate line GGL. Accordingly, the current sensing circuit TSC may sense the sum of current flowing to one grouping gate line GGL.

This current sensing value may correspond to a temperature for two or more touch sensor unit areas TSU corresponding to two or more sensing lines SL1, SL2, SL3 and SLA.

The group sensing described above may be a very effective and fast sensing method when the contact area between the touch pointer (e.g., finger, pen) and the display panel 110 is small.

If two or more grouping transistors GT1, GT2, GT3 and GT4 are turned off simultaneously in response to the grouping scanning signal GSCAN supplied from the grouping gate line GGL, two or more sensing lines SL1, SL2, SL3 and SLA may be electrically separated simultaneously from one grouping gate line GGL.

Two or more sensing lines SL1, SL2, SL3 and SLA may be electrically connected to one group sensing line GSL through two or more grouping transistors GT1, GT2, GT3 and GT4.

Figure 14:
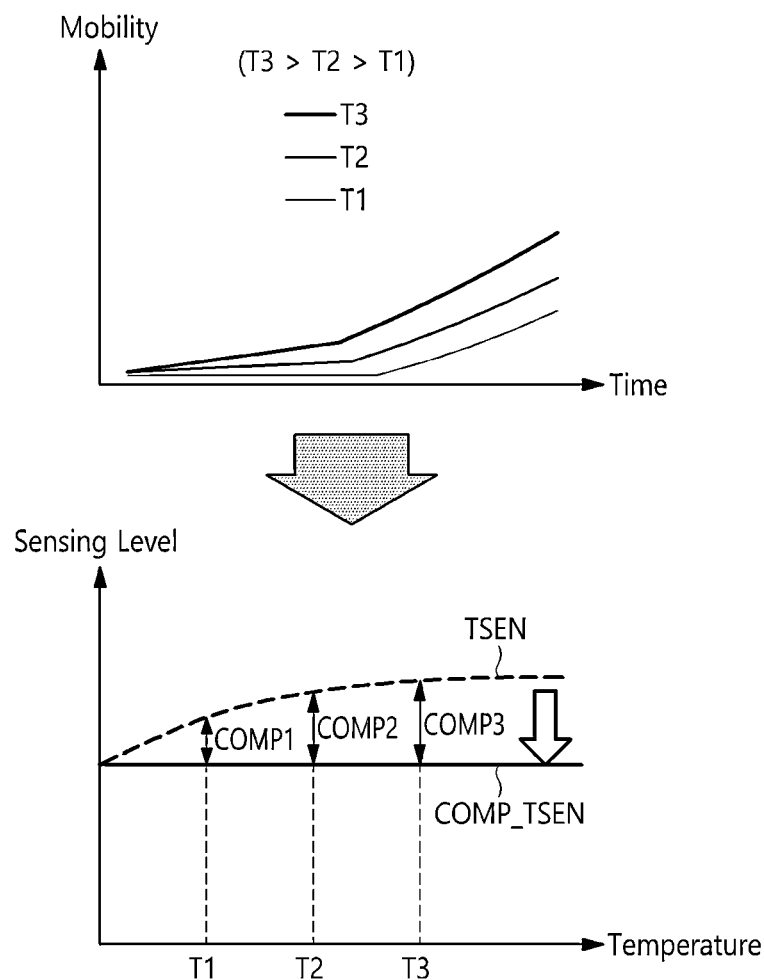
FIG. 14 illustrates compensation processing for touch sensitivity changes due to temperature changes in a touch display device according to embodiments of the present disclosure.

FIG. 14 illustrates compensation processing for touch sensitivity changes due to temperature changes in a touch display device 100 according to embodiments of the present disclosure.

FIG. 14 illustrates a graph representing a change in mobility of the first sensing transistor ST1 over time (hereinafter referred to as a mobility graph) and a graph representing a touch sensing value and a compensated touch sensing value over temperature (hereinafter referred to as a touch sensing value graph).

Referring to FIG. 14, the mobility graph represents a change in mobility of the first sensing transistor ST1 over time for three temperatures T1, T2 and T3. Here, a third temperature T3 may be the highest temperature, and a first temperature T1 may be the lowest temperature. That is, the third temperature T3 is higher than a second temperature T2, and the second temperature T2 is higher than the first temperature T1.

Referring to FIG. 14, at a specific time point, the higher the temperature, the higher the mobility. That is, the mobility of the first sensing transistor ST1 may have the largest third mobility value when a temperature is the third temperature T3, the mobility of the first sensing transistor ST1 may have the smallest first mobility value at the first temperature T1. In addition, when the second temperature T2 is present, the mobility of the first sensing transistor ST1 may have a second mobility value between the first mobility value and the third mobility value.

Accordingly, the current sensing circuit TSC may obtain the largest third current sensing value when a temperature is the third temperature T3, the smallest first current sensing value when a temperature is the first temperature T1, and a second current sensing value between the first current sensing value and the third current sensing value when a temperature is the second temperature T2.

Further, for each of the first to third temperatures T1 to T3, mobility of the first sensing transistor ST1 increases over time. That is, the mobility of the first sensing transistor ST1 increases over time when a temperature is the third temperature T3, the mobility of the first sensing transistor ST1 increases over time when a temperature is the second temperature T2, and the mobility of the first sensing transistor ST1 increases over time when a temperature is the first temperature T1.

The touch display device 100 according to the embodiments of the present disclosure may include a memory for storing a lookup table with a compensation value corresponding to each current sensing value.

For example, when the touch controller 170 receives a first current sensing value from the current sensing circuit TSC and then receives a first touch sensing value TSEN from the touch driving circuit 160 during a touch period TP, the touch controller 170 may change the first touch sensing value TSEN using the first current sensing value to generate a second touch sensing value COMP_TSEN.

The second touch sensing value COMP_TSEN may be a value obtained by subtracting a first compensation value COMP1 corresponding to the first current sensing value from the first touch sensing value TSEN (i.e., COMP_TSEN=TSN−COMP1). Here, the first compensation value COMP1 may be a compensation value extracted from a lookup table, and may be a compensation value corresponding to the first current sensing value. Also, the first compensation value COMP1 may be a compensation value corresponding to the first temperature sensing value.

The touch controller 170 may extract the first compensation value COMP1 from the lookup table. The second touch sensing value COMP_TSEN may be a touch sensing value from which the temperature influence is removed from the first touch sensing value TSEN.

For another example, if the touch controller 170 receives a second current sensing value from the current sensing circuit TSC as a result of temperature sensing (e.g., current sensing) performed during the display period DP, and then receives a first touch sensing value TSEN from the touch driving circuit 160 during the touch period TP, the touch controller 170 may change the first touch sensing value TSEN using the second current sensing value to generate a second touch sensing value COMP_TSEN.

The second touch sensing value COMP_TSEN may be a value obtained by subtracting a second compensation value COMP2 corresponding to the second current sensing value from the first touch sensing value TSEN (i.e., COMP_TSEN=TSEN−COMP2). Here, the second compensation value COMP2 may be a compensation value extracted from a lookup table and may be a compensation value corresponding to the second current sensing value. Also, the second compensation value COMP2 may be a compensation value corresponding to the second temperature sensing value.

The touch controller 170 may extract the second compensation value COMP2 from the lookup table. The second touch sensing value COMP_TSEN may be a touch sensing value from which the temperature influence is removed from the first touch sensing value TSEN.

As another example, if the touch controller 170 receives a third current sensing value from the current sensing circuit TSC as a result of temperature sensing (e.g., current sensing) performed during the display period DP, and then, if the touch controller 170 receives the first touch sensing value TSEN from the touch driving circuit 160 during the touch period TP, the touch controller 170 may change the first touch sensing value TSEN using the third current sensing value to generate the second touch sensing value COMP_TSEN.

The second touch sensing value COMP_TSEN may be a value obtained by subtracting a third compensation value COMP3 corresponding to the third current sensing value from the first touch sensing value TSEN (i.e., COMP_TSEN=TSEN−COMP3). Here, the third compensation value COMP3 may be a compensation value extracted from a lookup table and may be a compensation value corresponding to the third current sensing value. Also, the third compensation value COMP3 may be a compensation value corresponding to the third temperature sensing value.

The higher the temperature sensing value corresponding to the current sensing value, the larger the compensation value COMP, and thus the greater the difference between the first touch sensing value TSEN and the second touch sensing value COMP_TSEN may be.

The touch controller 170 may extract the third compensation value COMP3 from the lookup table. The second touch sensing value COMP_TSEN may be a touch sensing value from which the temperature influence is removed from the first touch sensing value TSEN.

As above, there has been described the first driving method in which the first sensing line SL1 becomes the current sensing path among the two driving methods. Hereinafter, it will be described the second driving method in which the first touch line TL1 becomes the current sensing path. Hereinafter, it will be omitted the description of the same features as the first driving method.

Figure 15:
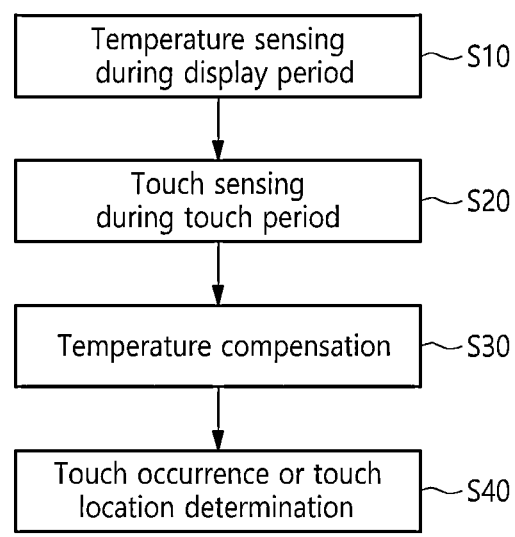
FIG. 15 is a flowchart of a touch sensing method in a touch display device according to embodiments of the present disclosure.

FIG. 15 is a flowchart of a touch sensing method in a touch display device 100 according to embodiments of the present disclosure.

Referring to FIG. 15, a touch sensing method of the touch display device 100 according to the embodiments of the present disclosure may include a temperature sensing step (S10), a touch sensing step (S20), a temperature compensation step (S30), and a touch occurrence or touch location determination step (S40).

In the temperature sensing step (S10), the current sensing circuit TSC or the touch driving circuit 160 of the touch display device 100 may sense the temperature of an area of the first touch sensor TS1 to obtain a temperature sensing value, or sense the current through the first touch sensor TS1 to obtain the current sensing value as the temperature sensing value. Here, the current may vary depending on the temperature. For example, in the temperature sensing step (S10), the temperature sensing is performed to obtain the temperature sensing value during the display period.

In the touch sensing step S20, the touch driving circuit 160 of the touch display device 100 may acquire a first touch sensing value through the first touch sensor TS1 during the touch period TP.

In the temperature compensation step (S30), the touch controller 170 of the touch display device 100 may create the second touch sensing value by changing the first touch sensing value based on a temperature sensing value corresponding to the current sensing value (see FIG. 14).

In the touch occurrence or touch location determination step (S40), the touch controller 170 of the touch display device 100 may determine the touch occurrence or touch location based on a second touch sensing value.

Here, the second touch sensing value may be a value from which the temperature influence is removed from the first touch sensing value. Therefore, the determination of the presence or absence of a touch and/or the touch location according to the second touch sensing value may be an accurate touch sensing result.

The temperature for an area of the first touch sensor TS1 may be a temperature of the first touch sensor TS1 or a surrounding temperature of the first touch sensor TS1.

As the temperature related to the first touch sensor TS1 increases, the amount of current flowing per unit time through the first touch sensor TS1 may increase.

The temperature sensing step (S10) for obtaining the temperature sensing value may be performed during the display period DP. Therefore, while the temperature sensing step (S10) for obtaining the temperature sensing value is performed, a data voltage for displaying an image may be supplied to a subpixel SP adjacent to the first touch sensor TS1.

The higher the temperature sensing value corresponding to the current sensing value, the larger the compensation value COMP, and thus the greater the difference between the first touch sensing value TSEN and the second touch sensing value COMP_TSEN may be (see FIG. 14).

In step S10, if the first current sensing value or the first temperature sensing value corresponding to the first temperature T1 is obtained, a first compensation value COMP1 corresponding to the first current sensing value or the first temperature sensing value may be determined by referring to a lookup table. Accordingly, the second touch sensing value COMP_TSEN may be a value obtained by subtracting the first compensation value COMP1 corresponding to the first current sensing value or the first temperature sensing value from the first touch sensing value TSEN (i.e., COMP_TSEN=TSN−COMP1). Here, the first compensation value COMP1 may be a value obtained by multiplying the first current sensing value or the first temperature sensing value by a first weight.

In step S10, if a second current sensing value or a second temperature sensing value corresponding to a second temperature T2 higher than the first temperature T1 is obtained, a second compensation value COMP2 corresponding to the second current sensing value or the second temperature sensing value may be determined by referring to the lookup table. Accordingly, the second touch sensing value COMP_TSEN may be a value obtained by subtracting the second compensation value COMP2 corresponding to the second current sensing value or the second temperature sensing value from the first touch sensing value TSEN (i.e., COMP_TSEN=TSEN-COMP2). Here, the second compensation value COMP2 may be a value obtained by multiplying the second current sensing value or the second temperature sensing value by a second weight. Here, the second weight may be a value greater than the first weight.

In step S10, if a third current sensing value or a third temperature sensing value corresponding to a third temperature T3 higher than the second temperature T2 is obtained, a third compensation value COMP3 corresponding to the third current sensing value or the third temperature sensing value may be determined by referring to the lookup table. Accordingly, the second touch sensing value COMP_TSEN may be a value obtained by subtracting the third compensation value COMP3 corresponding to the third current sensing value or the third temperature sensing value from the first touch sensing value TSEN (i.e., COMP_TSEN=TSEN-COMP3). Here, the third compensation value COMP3 may be a value obtained by multiplying the third current sensing value or the third temperature sensing value by a third weight. Here, the third weight may be a value greater than the second weight.

Figure 16A:
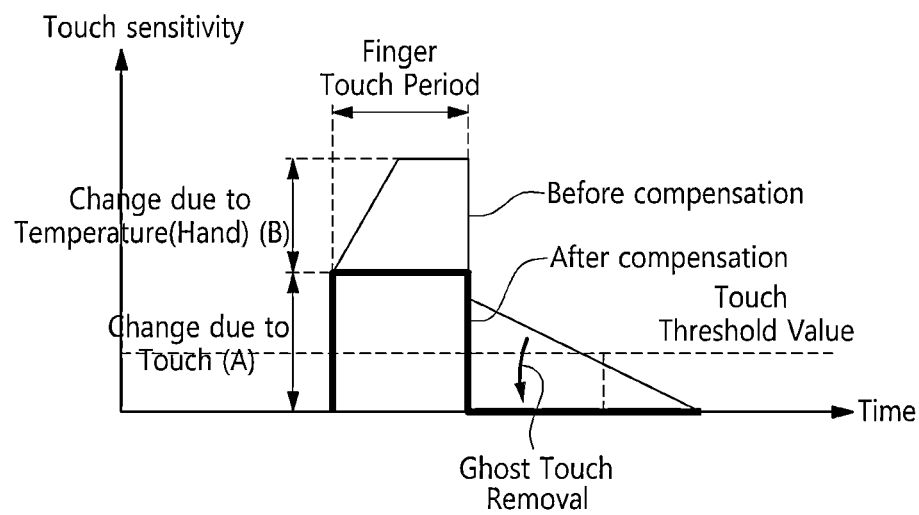
FIG. 16A is a touch sensitivity graph for explaining compensation processing of touch sensitivity change according to temperature change by finger touch of a touch display device according to embodiments of the present disclosure.

FIG. 16A is a touch sensitivity graph for explaining compensation processing of touch sensitivity change (i.e., change in touch sensing value) according to temperature change by finger touch of a touch display device 100 according to embodiments of the present disclosure.

Referring to FIG. 16A, when a finger touch occurs, the temperature of the finger may be transferred to the display panel 110, which may cause a positive thermal drift phenomenon. The temperature change of the display panel 110 may occur due to the finger touch. That is, if the temperature of the touch pointer is higher than the surface temperature of the display panel 110, the parasitic capacitance increases due to the high temperature of the touch pointer during the touch occurrence time.

Referring to FIG. 16A, it will be described a touch sensing value (i.e., touch sensitivity) before performing the compensation processing of the touch sensitivity change according to the embodiments of the present disclosure as follows.

A temperature change of the display panel 110 may occur due to a finger touch. The amount of change in the touch sensing value due to the temperature change of the display panel 110 due to the finger touch may include an amount of change (A) in the touch sensing value due to the finger touch and an amount of change (B) in the touch sensing value due to the temperature of the finger.

The amount of change (A) in the touch sensing value due to the finger touch may be a normal part which is absolutely necessary for touch sensing, and may be a part occurred by the finger capacitance Cfinger.

The amount of change (B) in the touch sensing value due to the temperature of the finger may be an unwanted part which may cause a decrease in touch sensitivity, and may be a part caused by an increase in parasitic capacitance $\Delta Cp$ due to a positive thermal drift phenomenon during the finger touch period.

After the finger touch disappears, the touch sensing value decreases, but may not immediately fall to a level before the touch occurrence, and may have a value higher than a touch threshold for a certain period of time. Here, the touch threshold may mean the minimum touch sensing value for determining that a touch has occurred.

Even if the finger touch disappears, if a touch sensing value higher than the touch threshold is obtained from the touch driving circuit 160 for a certain period of time (e.g., the ghost touch occurrence period), the touch controller 170 may incorrectly recognize that a touch has occurred. This ghost touch recognition may be a factor which may significantly reduce touch sensitivity.

After compensation processing for touch sensitivity change according to embodiments of the present disclosure is performed, the touch sensing value (i.e., touch sensitivity) may be as follows.

The touch sensing value TSEN generated by the touch driving circuit 160 based on the touch sensing result may be a value obtained by adding the amount of change (A) of the touch sensing value due to the finger touch and the amount of change (B) of the touch sensing value due to the temperature of the finger, and the compensation value COMP calculated through the current sensing may correspond to the amount of change (B) of the touch sensing value due to the temperature of the finger.

A compensated touch sensing value COMP_TSEN may be a value calculated by subtracting the compensation value COMP from the touch sensing value TSEN (i.e., COMP_TSEN=TSEN-COMP). Accordingly, the compensated touch sensing value COMP_TSEN may include only the amount of change (A) of the touch sensing value due to the finger touch, and does not include the amount of change (B) of the touch sensing value due to the temperature of the finger.

The amount of change (B) in the touch sensing value due to the temperature of the finger may be an unwanted part which may cause a deterioration of the touch sensitivity. Therefore, as illustrated in FIG. 16A, after compensation, the ghost touch may be eliminated since the touch occurrence and/or the touch location is determined using the compensated touch sensing value COMP_TSEN from which the amount of change (B) in the touch sensing value according to the temperature of the finger is removed.

Also, the touch sensitivity may be reduced not only by finger touch but also by image change. Here, the image change may mean a change in the gradation of the image. In the exemplary embodiments of the present disclosure, the image change may have an effect equivalent to the temperature change of the display panel 110.

Figure 16B:
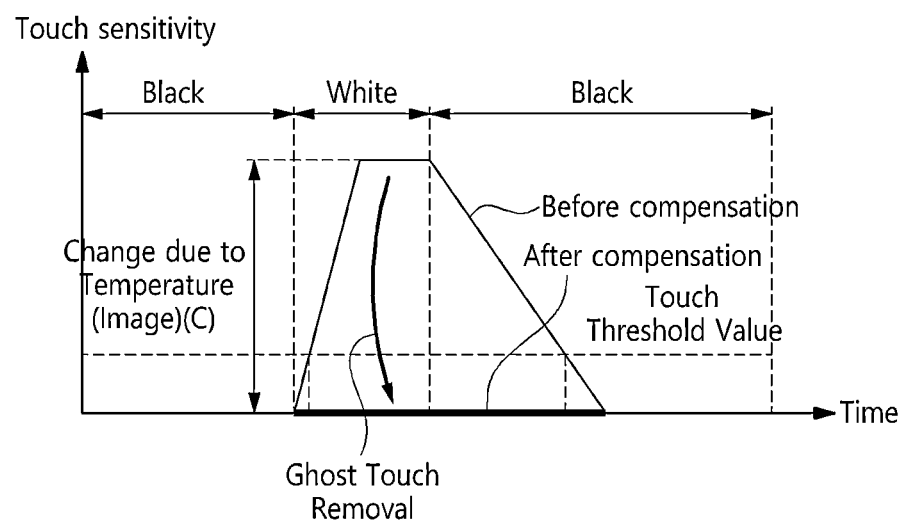
FIG. 16B is a touch sensitivity graph for explaining compensation processing of touch sensitivity change according to temperature change by image change of a touch display device according to embodiments of the present disclosure.

FIG. 16B is a touch sensitivity graph for explaining compensation processing of touch sensitivity change (i.e., change in touch sensing value) according to temperature change by image change of a touch display device 100 according to embodiments of the present disclosure.

Referring to FIG. 16B, the touch sensitivity may be reduced not only by finger touch but also by image change. Here, the image change may mean a change in the gradation of the image. In the exemplary embodiments of the present disclosure, the image change may have an effect equivalent to the temperature change of the display panel 110.

Referring to FIG. 16B, the touch sensing value (i.e., touch sensitivity) before performing the compensation processing of the touch sensitivity change according to the embodiments of the present disclosure may be as follows.

Referring to FIG. 16B, the phenomenon of the surface temperature of the display panel 110 increasing due to finger touch may occur similarly even when the image changes. That is, if the image changes, the positive thermal drift phenomenon may occur similarly. That is, even though no touch occurs, the touch sensing value may change due to the image change.

Referring to FIG. 16B, an amount of change in the touch sensing value due to the image change may be considered as an amount of change (C) in the touch sensing value due to the temperature change of the display panel 110 corresponding to the image change.

For example, when changing from a low-gray image (e.g., a black image) to a high-gray image (e.g., a white image), a touch sensing value higher than a touch threshold value may be obtained from the touch driving circuit 160 even though a touch has not actually occurred. When changing from a high-gray image (e.g., a white image) to a low-gray image (e.g., a black image), the touch sensing value may not immediately fall below the touch threshold value, but may fall below the touch threshold value after a short period of time has elapsed.

Referring to FIG. 16B, even when a touch has not actually occurred, if a touch sensing value higher than the touch threshold value is obtained from the touch driving circuit 160 according to an image change, the touch controller 170 may recognize that a touch has occurred during a period (e.g., ghost touch occurrence period) in which the touch sensing value is higher than the touch threshold value. This ghost touch recognition may be a factor which may significantly reduce touch sensitivity.

After the compensation processing of the touch sensitivity change according to the embodiments of the present disclosure is performed, the touch sensing value (i.e., touch sensitivity) may be described as follows.

The touch sensing value TSEN generated by the touch driving circuit 160 according to the touch sensing result may be a value corresponding to the amount of change (C) of the touch sensing value due to the temperature change corresponding to the image change. The compensation value COMP calculated through current sensing may correspond to the amount of change (C) of the touch sensing value due to the temperature change corresponding to the image change.

The compensated touch sensing value COMP_TSEN may be a value calculated by subtracting the compensation value COMP from the touch sensing value TSEN (i.e., COMP_TSEN=TSEN-COMP). Accordingly, the compensated touch sensing value COMP_TSEN may not include a value corresponding to the amount of change (C) of the touch sensing value due to the temperature change corresponding to the image change.

The amount of change (C) of the touch sensing value due to the temperature change corresponding to the image change may be an unwanted part which may cause a deterioration of the touch sensitivity. Therefore, as illustrated in FIG. 16B, after compensation, the touch occurrence and/or a touch location may be determined using the compensated touch sensing value COMP_TSEN from which the amount of change (C) of the touch sensing value due to the temperature change corresponding to the image change is removed, so that the ghost touch can be eliminated.

As described above, as illustrated in FIG. 7, a plurality of touch sensors TS may be electrically connected to form a single touch electrode TE in the touch display device 100 according to the embodiments of the present disclosure.

Accordingly, the touch display device 100 according to the embodiments of the present disclosure may include a plurality of touch bridges TB electrically connecting a plurality of touch sensors TS in a single touch electrode unit area TEU where a single touch electrode TE is formed. Referring to FIG. 7, a single touch electrode unit area TEU where a single touch electrode TE is formed may include touch sensors TS arranged in n rows and m columns.

In the touch display device 100 according to the embodiments of the present disclosure, the plurality of touch bridges TB may be disposed parallel to a plurality of scanning gate lines SCL.

The touch display device 100 according to the embodiments of the present disclosure may have an individual touch bridge structure in which each of the plurality of touch bridges TB is disposed for each touch sensor row.

For example, one touch bridge TB may be disposed for each scanning gate line SCL. That is, the number of touch bridges TB and the number of scanning gate lines SCL may be the same.

In this case, since a touch bridge TB is disposed for each touch sensor row, a lot of touch bridges TB may be disposed on the display panel 110. As a result, the parasitic capacitance may increase and the load may increase due to a lot of touch bridges TB.

Figure 17:
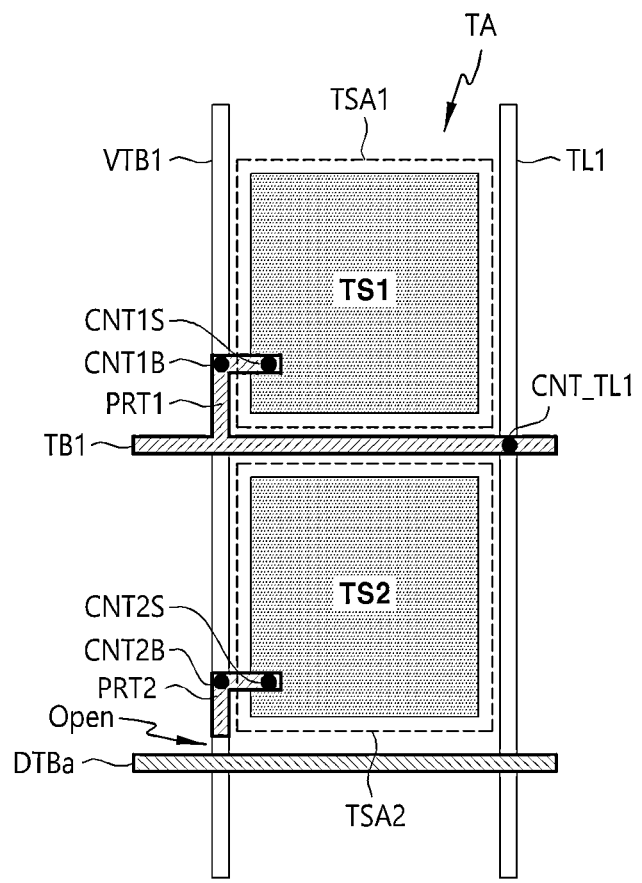
FIG. 17 is a schematic diagram illustrating a touch sensor structure of a touch display device according to embodiments of the present disclosure.

In one embodiment, as illustrated in FIG. 17, the touch display device 100 may have a shared touch bridge structure for reducing parasitic capacitance and reducing load. Hereinafter, it will be described a shared touch bridge structure according to embodiments of the present disclosure.

The shared touch bridge structure may include at least one touch bridge disposed in a horizontal direction (also referred to as a row direction or horizontal direction) and at least one touch bridge (also referred to as a sub-touch bridge or vertical sub-touch bridge) arranged in a vertical direction (also referred to as a column direction or vertical direction).

FIG. 17 is a schematic diagram illustrating a touch sensor structure of a touch display device 100 according to embodiments of the present disclosure.

Referring to FIG. 17, the touch display device 100 according to the embodiments of the present disclosure may include a first touch sensor TS1 disposed in a transmission area TA, a first touch line TL1 electrically connected to the first touch sensor TS1 and extending in the column direction, and a first touch bridge TB1 electrically connected to the first touch line TL1 through a corresponding contact hole CNT_TL1 and extending in the row direction.

Referring to FIG. 17, the touch display device 100 according to the embodiments of the present disclosure may further include a first sub-touch bridge VTB1 extending in the column direction in addition to the first touch bridge TB1 extending in the row direction. For example, the first touch bridge TB1 may include the first protrusion PRT1.

Referring to FIG. 17, the first sub-touch bridge VTB1 may be electrically connected to the first touch bridge TB1 and the first touch sensor TS1.

For example, a part of the first sub-touch bridge VTB1 may be connected to the first touch bridge TB1, and another part of the first sub-touch bridge VTB1 may be connected to the first touch sensor TS1.

For another example, a part of the first sub-touch bridge VTB1 may be connected to a first protrusion PRT1 of the first touch bridge TB1 through a corresponding contact hole CNT1B, and the first protrusion PRT1 of the first touch bridge TB1 may be connected to the first touch sensor TS1 through a corresponding contact hole CNTIS. For example, the first protrusion PRT1 may include a first part extending in the column direction with respect to the first touch bridge TB1. For another example, the first protrusion PRT1 may include a first part extending in the column direction with respect to the first touch bridge TB1 and a second part extending in the row direction from the first part.

Referring to FIG. 17, the first touch sensor TS1 may be included in the transmission area TA.

The first sub-touch bridge VTB1 may not overlap with the first touch sensor TS1 at all, or may not overlap with the first touch sensor TS1 at all except for a portion connected to the first touch sensor TS1.

Accordingly, even if the first sub-touch bridge VTB1 exists as a touch sensor structure, there may be reduced or minimized the decrease of transmittance of the transmission area TA where the first touch sensor TS1 is disposed.

In addition, the first sub-touch bridge VTB1 may not overlap (e.g., non-overlapping) with the first electrodes E1 disposed in the first pixel area PA1, so that it is possible to significantly reduce a coupling between the touch bridge configurations (e.g., TB1 and VBT1) and the first electrodes E1 related to display driving.

That is, the influence between the display driving and the touch driving may be significantly reduced by the first sub-touch bridge VTB1 which is a touch bridge configuration in the column direction. In particular, by configuring the first sub-touch bridge VTB1 in the column direction, there may significantly reduce the display-to-touch crosstalk (DTX) due to the touch bridge configuration.

Referring to FIG. 17, the touch display device 100 according to the embodiments of the present disclosure may further include a second touch sensor TS2 disposed in the transmission area TA. The second touch sensor TS2 may be adjacent to the first touch sensor TS1 in the column direction.

Referring to FIG. 17, the touch display device 100 according to the embodiments of the present disclosure may further include a dummy touch bridge DTBa which intersects the first touch line TL1 and the first sub-touch bridge VTB1, but is electrically separated from the first touch line TL1 and the first sub-touch bridge VTB1, and is disposed parallel to the first touch bridge TB1.

Referring to FIG. 17, a second protrusion pattern PRT2 may be connected to the first sub-touch bridge VTB1 through a corresponding contact hole CNT2B, and may be connected to the second touch sensor TS2 through a corresponding contact hole CNT2S. The second protrusion pattern PRT2 may electrically connect the second touch sensor TS2 and the first sub-touch bridge VTB1. The second protrusion pattern PRT2 may be disposed on the same layer as the dummy touch bridge DTBa. The second protrusion pattern PRT2 may exist in a disconnected state (e.g., open state) from the dummy touch bridge DTBa. For example, the second protrusion pattern PRT2 may include a first part extending in the column direction with respect to the first touch bridge TB1 and a second part extending in the row direction from the first part.

Referring to FIG. 17, the dummy touch bridge DTBa may not be present in the touch sensor structure. However, if the dummy touch bridge DTBa does not exist, a difference in image quality may occur between an area where the touch bridge is present and an area where the touch bridge is not present. For example, if the dummy touch bridge DTBa is not disposed, there may occur a phenomenon in which a specific area (e.g., a specific horizontal area) within the screen appears strange.

According to the shared touch bridge structure of the touch display device 100 according to the embodiments of the present disclosure, a dummy touch bridge DTBa may be disposed in an area where the touch bridge TB has disappeared, thereby preventing a phenomenon in which a specific area (e.g., a specific horizontal area) within the screen appears strange.

Figure 18:
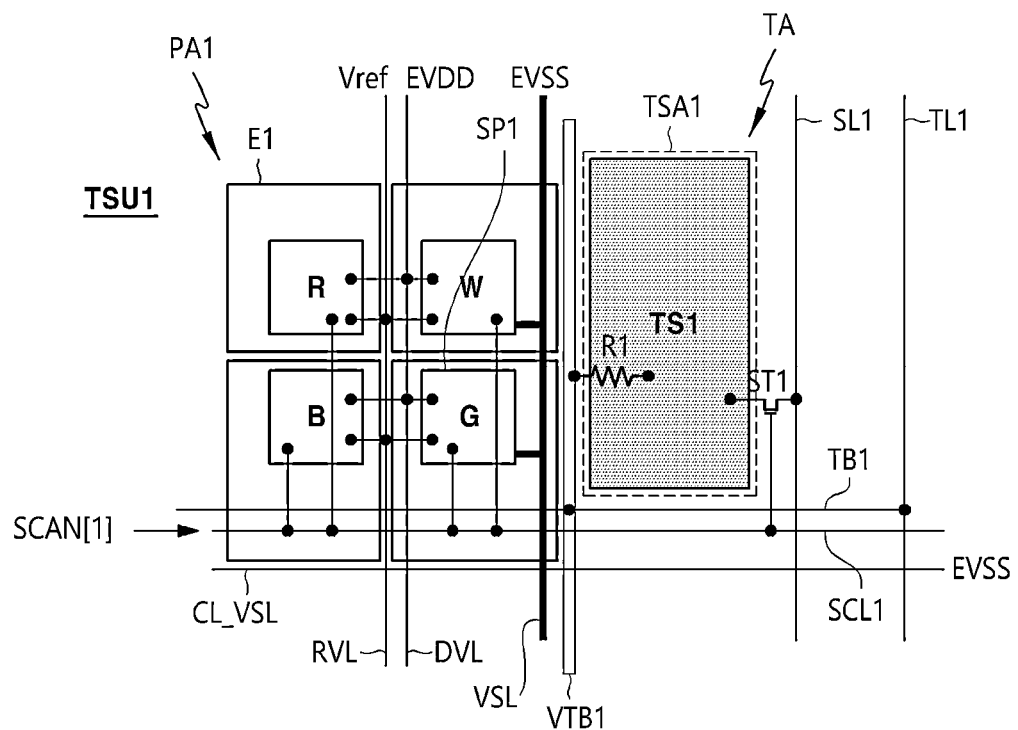
FIG. 18 illustrates one touch sensor unit area of a touch display device according to embodiments of the present disclosure.

FIG. 18 illustrates one first touch sensor unit area TSU1 of a touch display device 100 according to embodiments of the present disclosure.

Referring to FIG. 18, the first touch sensor unit area TSU1 may include a first pixel area PA1 in which at least one first subpixel SP is disposed, and a first touch sensor area TSA1 in which the first touch sensor TS1 is disposed.

The first touch sensor area TSA1 may be located on one side of the first pixel area PA1.

The first subpixel SP1 disposed in the first pixel area PA1 may include a light emitting device ED and a scanning transistor SCT, etc. Also, the first subpixel SP1 disposed in the first pixel area PA1 may further include a driving transistor DRT, and one capacitor Cst. The first subpixel SP may be configured as shown in FIG. 2.

Referring to FIG. 18, the touch display device 100 according to the embodiments of the present disclosure may further include a plurality of first display driving lines arranged to cross the first touch sensor unit area TSU1 in the column direction. The plurality of first display driving lines may be connected to the first subpixel SP1.

Referring to FIG. 18, the plurality of first display driving lines may include two or more of a first driving power line DVL for supplying a first driving power signal EVDD to the first subpixel SP, a second driving power line VSL for supplying a second driving power signal EVSS to the first subpixel SP, a reference voltage line RVL for supplying a reference voltage to the first subpixel SP, and a data line DL for supplying a data voltage Vdata to the first subpixel SP.

Referring to FIG. 18, the touch display device 100 according to the embodiments of the present disclosure may further include a second driving power horizontal line CL_VSL arranged to cross the first touch sensor unit area TSU1 in the row direction. The second driving power horizontal line CL_VSL may be a wiring for supplying the second driving power signal EVSS, and may be electrically connected to the second driving power line VSL in the column direction.

Referring to FIG. 18, a touch display device 100 according to embodiments of the present disclosure may include a first subpixel SP1 including a first light emitting device and a first scanning transistor, a first touch sensor TS1 adjacent to the first subpixel SP1 in a row direction, the first touch sensor TS1 located on one side of the first pixel area PA1, a first touch line TL1 electrically connected to the first touch sensor TS1 and extending in a column direction, a first sensing line SL1 disposed adjacent to the first touch line TL1 and extending in a column direction, a first sensing transistor ST1 controlling an electrical connection between the first sensing line SL1 and the first touch sensor TS1, a first touch bridge TB1 electrically connected to the first touch line TL1 and extending in a row direction, and a sub-touch bridge VTB1 electrically connected to the first touch bridge TB1 and the first touch sensor TS1, extending in the column direction, and disposed between the first subpixel SP1 and the first touch sensor TS1. Also, the first subpixel SP1 may further include a first driving transistor, and a capacitor.

As one example, in order to increase the accuracy of temperature sensing, the first sensing transistor ST1 may be a transistor having a characteristic of a large change in mobility with respect to a temperature change. That is, the first sensing transistor ST1 may be a transistor having a characteristic change sensitive to a temperature change, without being limited thereto.

Referring to FIG. 18, the connection between the first sub-touch bridge VTB1 and the first touch sensor TS1 may be a type of resistance pattern R1.

The touch display device 100 according to the embodiments of the present disclosure may further include a first scanning gate line SCL1 electrically connected to a gate node of the first scanning transistor and a gate node of the first sensing transistor ST1.

The first scanning gate line SCL1 may be arranged parallel to the first touch bridge TB1.

Referring to FIG. 18, a touch display device 100 according to embodiments of the present disclosure may further include a dummy touch bridge DTBa which intersects the first touch line TL1 and the first sub-touch bridge VTB1 arranged in the column direction, but is electrically separated from the first touch line TL1 and the first sub-touch bridge VTB1, and is arranged parallel to the first touch bridge TB1. It is possible to prevent a phenomenon in which a specific area (e.g., a specific horizontal area) within the screen appears strange by disposing the dummy touch bridge DTBa in an area where the touch bridge TB has disappeared.

Referring to FIG. 18, in the touch display device 100 according to the embodiments of the present disclosure, the first sub-touch bridge VTB1 may not overlap with the first touch sensor TS1.

Figure 19:
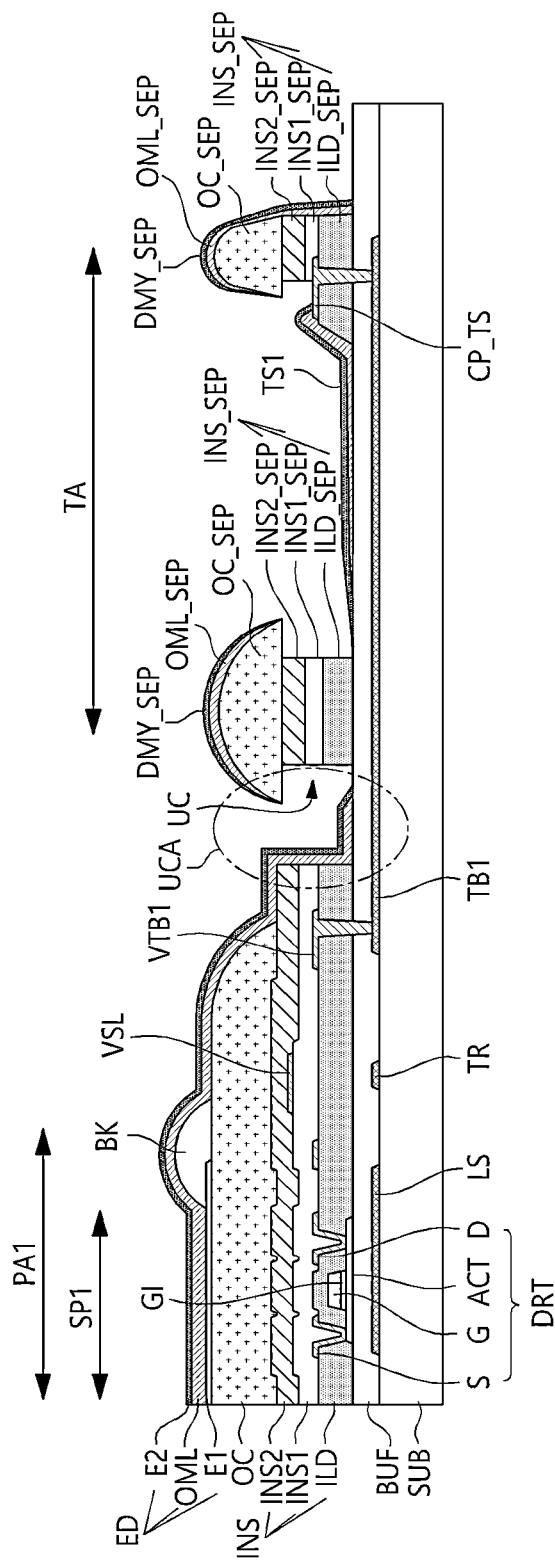
FIG. 19 and FIG. 20 are cross-sectional views of a touch display device according to embodiments of the present disclosure.
Figure 20:
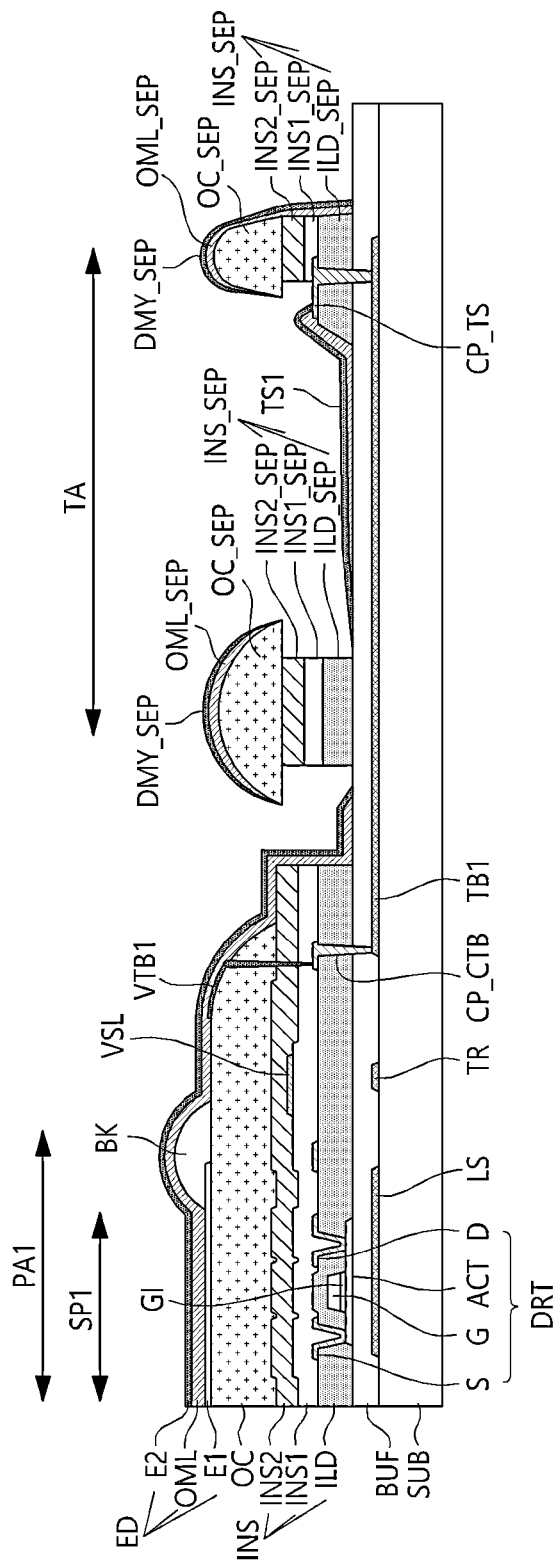

FIG. 19 and FIG. 20 are cross-sectional views of the touch display device 100 according to the embodiments of the present disclosure.

Referring to FIG. 19 and FIG. 20, the touch display device 100 according to the embodiments of the present disclosure may include a transistor (e.g., a driving transistor DRT) and a light emitting device ED disposed on a substrate SUB, and may further include a touch sensor structure including a first touch sensor TS1, a first touch bridge TB1, and a first sub-touch bridge VTB1.

In addition, the touch display device 100 according to the embodiments of the present disclosure may include various insulating layer structures such as a buffer layer BUF, a gate insulating layer GI, an interlayer insulating layer ILD, a first insulating layer INS1, a second insulating layer INS2, and an overcoat layer OC.

Referring to FIGS. 19 and 20, in the present specification, the interlayer insulating layer ILD, the first insulating layer INS1, and the second insulating layer INS2 may be collectively referred to as an insulating layer INS.

A light-shielding layer (LS), which is a metal layer located at the lowest position, may be disposed on the substrate SUB, and a buffer layer BUF may be disposed on the light-shielding layer LS. For example, the light-shielding layer (LS) may be disposed on a portion of the substrate SUB, and the buffer layer BUF may be disposed on the light-shielding layer (LS) and a portion of the substrate SUB.

An active layer ACT may be disposed on the buffer layer BUF, the gate insulating layer GI may be disposed on the active layer ACT, and a gate electrode G may be disposed on the gate insulating layer GI. For example, the active layer ACT may be disposed on a portion of the buffer layer BUF, and the gate insulating layer GI may be disposed on a portion of the active layer ACT.

The interlayer insulating layer ILD may be disposed on the gate electrode G.

Each of a source electrode S and a drain electrode D of the driving transistor DRT may be disposed on the interlayer insulating layer ILD, and may be connected to a portion of the active layer ACT through a contact hole of the interlayer insulating layer ILD.

The first insulating layer INS1 may be disposed on the source electrode S and the drain electrode D of the driving transistor DRT, and the second insulating layer INS2 may be disposed on the first insulating layer INS1. For example, the first insulating layer INS1 may be disposed on the source electrode S, the drain electrode D of the driving transistor DRT and the interlayer insulating layer ILD.

The overcoat layer OC may be disposed on the second insulating layer INS2, and a first electrode E1 may be disposed on the overcoat layer OC. For example, the first electrode E1 may be disposed on a portion of the overcoat layer OC. A bank BK may be disposed on a portion of the first electrode E1. For example, the bank BK may be disposed on a portion of the first electrode E1 and a portion of the overcoat layer OC.

An organic layer OML may be disposed on the first electrode E1. Here, the organic layer OML may include an emission layer and a common layer, and the emission layer may be disposed only in an emission area, and the common layer may be disposed not only in the emission area but also in the non-emission area.

A second electrode E2 may be disposed on the organic layer OML.

A portion where the first electrode E1, the organic layer OML and the second electrode E2 overlap may form a light emitting device ED.

Referring to FIGS. 19 and 20, a touch display device 100 according to embodiments of the present disclosure may include the substrate SUB, the insulating layer INS on the substrate SUB, the overcoat layer OC on the insulating layer INS, the first electrode E1 disposed on the overcoat layer OC in a first pixel area PA1 including a first subpixel SP1, the organic layer OML disposed on the first electrode E1 in the first pixel area PA1, and a second electrode E2 disposed on the organic layer OML in the first pixel area PA1. Also, the touch display device 100 according to exemplary embodiments of the present disclosure may further include the buffer layer BUF on the light-shielding layer LS, and the light-shielding layer LS is disposed on the substrate SUB.

Referring to FIGS. 19 and 20, the overcoat layer OC may not disposed in an area where the first touch sensor TS1 is disposed.

Referring to FIGS. 19 and 20, in a touch display device 100 according to embodiments of the present disclosure, the first sub-touch bridge VTB1 may not overlap with the first touch sensor TS1.

Referring to FIGS. 19 and 20, the first touch sensor TS1 may include the same material as the second electrode E2. The first touch sensor TS1 and the second electrode E2 may be disposed within the same layer.

Referring to FIGS. 19 and 20, the touch display device 100 according to the embodiments of the present disclosure may further include a separation insulating layer INS_SEP separated from the insulating layer INS between the first pixel area PA1 and the first touch sensor TS1, and a separation overcoat layer OC_SEP separated from the overcoat layer OC between the first pixel area PA1 and the first touch sensor TS1.

Referring to FIGS. 19 and 20, the separation insulating layer INS_SEP may include a separation interlayer insulating layer ILD_SEP separated from the interlayer insulating layer ILD, a first separation insulating layer INS1_SEP separated from the first insulating layer INS1, and a second separation insulating layer INS2_SEP separated from the second insulating layer INS2. For example, the first separation insulating layer INS1_SEP may be disposed on the separation interlayer insulating layer ILD_SEP, and the second separation insulating layer INS2_SEP may be disposed on the first separation insulating layer INS1_SEP.

The separation overcoat layer OC_SEP may be positioned on the separation insulating layer INS_SEP.

Referring to FIGS. 19 and 20, the separation insulating layer INS_SEP may have an undercut structure UC that is sunken further inward than the separation overcoat layer OC_SEP by an undercut process. Accordingly, the bottom surface area (i.e., rear surface area) of the separation overcoat layer OC_SEP may be larger than the top surface area of the separation insulating layer INS_SEP.

Referring to FIGS. 19 and 20, the touch display device 100 according to the embodiments of the present disclosure may further include a separation organic layer OML_SEP on the separation overcoat layer OC_SEP and a separation dummy metal DMY_SEP on the separation organic layer OML_SEP.

Referring to FIG. 19 and FIG. 20, in an area UCA between the overcoat layer OC and the separation overcoat layer OC_SEP, the separation organic layer OML_SEP may include the same organic material as the organic layer OML, and may be disconnected from the organic layer OML.

The separation dummy metal DMY_SEP may include the same metal as the second electrode E2. However, the separation dummy metal DMY_SEP may be disconnected from the second electrode E2.

The separation dummy metal DMY_SEP may include the same metal as the first touch sensor TS1 in addition to the second electrode E2, and may be disconnected from the first touch sensor TS1.

The second electrode E2, the separation dummy metal (DMY_SEP, and the first touch sensor TS1 may include the same common electrode material. If the second electrode E2 is a cathode electrode, the common electrode material may be referred to as a cathode electrode material.

Since the overcoat layer OC and the separation overcoat layer OC_SEP are spaced apart from each other, and an undercut structure UC may be formed in the separation insulating layer INS_SEP under the separation overcoat layer OC_SEP, when an organic material is deposited on the overcoat layer OC and the separation overcoat layer OC_SEP, the organic layer OML and the separation organic layer OML_SEP may be formed while being effectively separated.

In addition, since the overcoat layer OC and the separation overcoat layer OC_SEP are spaced apart, and an undercut structure UC may be formed in the separation insulating layer INS_SEP under the separation overcoat layer OC_SEP, when a common electrode material is deposited on the overcoat layer OC and the separation overcoat layer OC_SEP, the second electrode E2, the separation dummy metal DMY_SEP and the first touch sensor TS1 may be formed by being effectively separated.

In addition, since the separation dummy metal DMY_SEP is disposed between the second electrode E2 and the first touch sensor TS1, there may be more completely achieved the separation and electrical disconnection between the second electrode E2 and the first touch sensor TS1.

Referring to FIG. 19 and FIG. 20, the first sub-touch bridge VTB1 may be disposed so as not to overlap with the area between the overcoat layer OC and the separation overcoat layer OC_SEP. Accordingly, it is possible to prevent the reduction of the transmittance of the transmission area TA due to the first sub-touch bridge VTB1.

Referring to FIG. 19, the first sub-touch bridge VTB1 may be disposed on the interlayer insulating layer ILD, and may include the same material as the source electrode S and the drain electrode D of the driving transistor DRT.

Referring to FIG. 19, the first sub-touch bridge VTB1 may be connected to a portion of the first touch bridge TB1 through a contact hole of the interlayer insulating layer ILD and the buffer layer BUF.

Referring to FIG. 19, the first touch sensor TS1 disposed in the transmission area TA may be disposed on the buffer layer BUF. The first touch bridge TB1 may be disposed between the substrate SUB and the buffer layer BUF. Also, the light-shielding layer (LS) may be disposed between the substrate SUB and the buffer layer BUF.

Referring to FIG. 19, the touch display device 100 may further include a touch connection pattern CP_TS connected to one end of the first touch bridge TB1.

Referring to FIG. 19, the touch connection pattern CP_TS may be disposed on the separation interlayer insulating layer ILD_SEP. For example, the touch connection pattern CP_TS may be disposed on a portion of the separation interlayer insulating layer ILD_SEP.

Referring to FIG. 19, a portion of the touch connection pattern CP_TS may be connected to the first touch sensor TS1, and another portion of the touch connection pattern CP_TS may be connected to the first touch bridge TB1 through a contact hole.

Referring to FIG. 20, the first sub-touch bridge VTB1 may be disposed on the overcoat layer OC, and may include the same material as the first electrode E1. For example, the first sub-touch bridge VTB1 may be disposed on a portion of the overcoat layer OC.

Referring to FIG. 20, the first touch sensor TS1 disposed on the transmission area TA may be disposed on the buffer layer BUF. For example, the first touch sensor TS1 may be disposed on a portion of the buffer layer BUF. The first touch bridge TB1 may be disposed between the substrate SUB and the buffer layer BUF.

Referring to FIG. 20, the first sub-touch bridge VTB1 may be connected to a connection pattern CP_CTB on the interlayer insulating layer ILD through a contact hole of the overcoat layer OC, the second insulating layer INS2, and the first insulating layer INS1. The connection pattern CP_CTB may be connected to a part of the first touch bridge TB1 through a contact hole of the interlayer insulating layer ILD and the buffer layer BUF.

Referring to FIG. 20, the touch display device 100 may further include a touch connection pattern CP_TS connected to one end of the first touch bridge TB1.

The touch connection pattern CP_TS may be disposed on the separation interlayer insulating layer ILD_SEP. For example, the touch connection pattern CP_TS may be disposed on a portion of the separation interlayer insulating layer ILD_SEP.

A portion of the touch connection pattern CP_TS may be connected to the first touch sensor TS1, and another portion of the touch connection pattern CP_TS may be connected to the first touch bridge TB1 through a contact hole.

Figure 21:
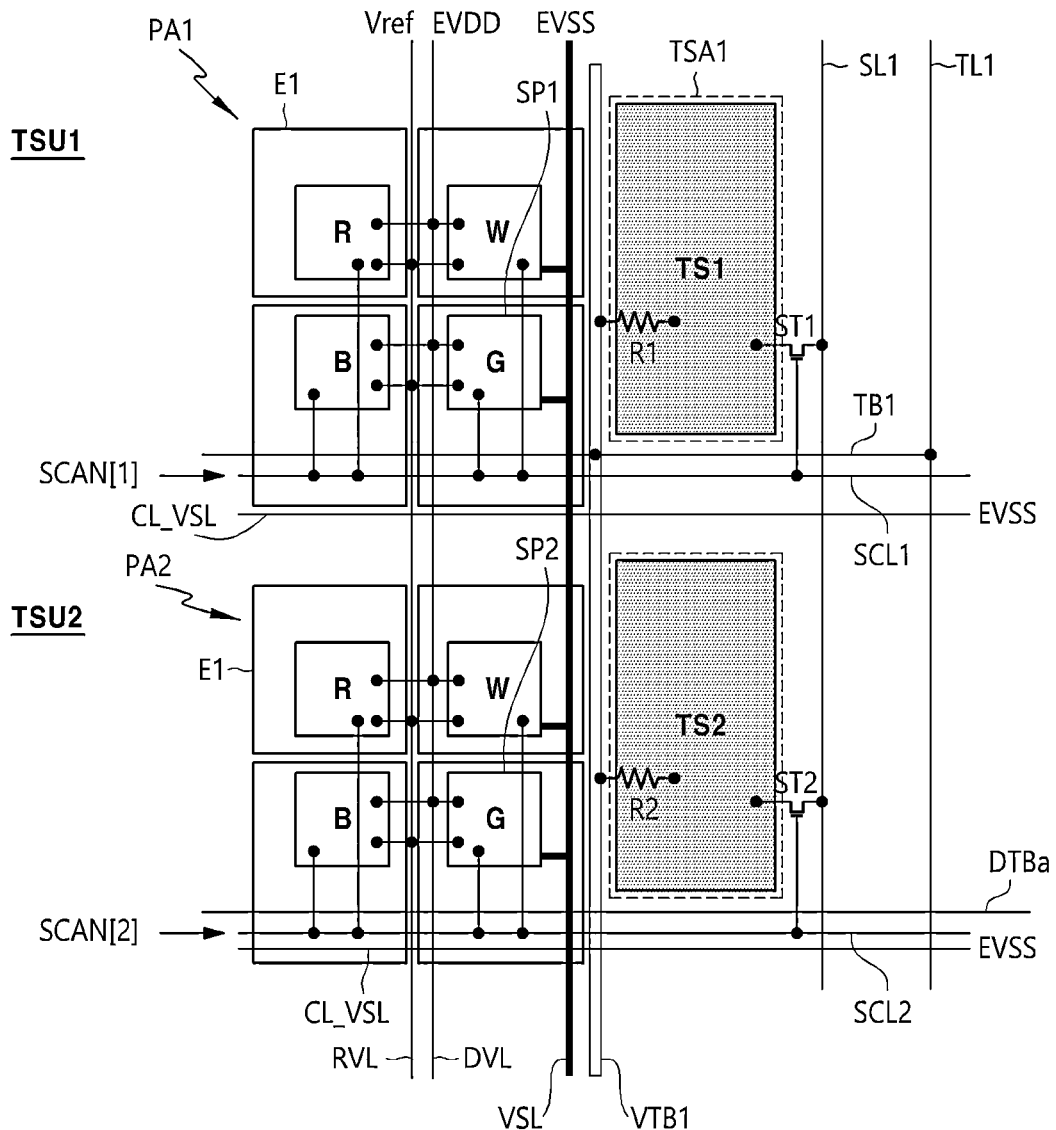
FIG. 21 illustrates two touch sensor unit areas of a touch display device according to embodiments of the present disclosure.

FIG. 21 illustrates two touch sensor unit areas TSU1 and TSU2 of the touch display device 100 according to embodiments of the present disclosure.

Referring to FIG. 21, the touch display device 100 may include a plurality of touch sensor unit areas, such as a first touch sensor unit area TSU1 and a second touch sensor unit area TSU2, without being limited thereto.

Referring to FIG. 21, a first sub-touch bridge VTB1 may be connected to a first touch sensor TS1 disposed in a first touch sensor area TSA1, and may be connected to a second touch sensor TS2 disposed in a second touch sensor area TSA2.

Referring to FIG. 21, a first touch bridge TB1 may be disposed at the bottom of the first touch sensor TS1 (i.e., between the first touch sensor TS1 and the second touch sensor TS2), and a dummy touch bridge DTBa may be disposed at the bottom of the second touch sensor TS2 instead of the touch bridge.

Referring to FIG. 21, the first touch sensor area TSA1 may be located on one side of the first pixel area PA1, and the second touch sensor area TSA2 may be located on one side of the second pixel area PA2.

Referring to FIG. 21, the first touch bridge TB1 may be electrically connected to the first sub-touch bridge VTB1, the first touch sensor TS1, and the first touch line TL1, but the dummy touch bridge DTBa may be not electrically connected to the first sub-touch bridge VTB1, the first touch sensor TS1 and the first touch line TL1.

Referring to FIG. 21, a connection between the first sub-touch bridge VTB1 and the first touch sensor TS1 may be defined as a first resistance pattern R1, and a connection between the first sub-touch bridge VTB1 and the second touch sensor TS2 may be defined as a second resistance pattern R2.

Referring to FIG. 21, a second driving power horizontal line CL_VSL may be arranged parallel to the first touch bridge TB1 and a first scanning gate line SCL1 at the bottom of the first touch sensor TS1. Another second driving power horizontal line CL_VSL may be arranged parallel to a second scanning gate line SCL2 and the dummy touch bridge DTBa at the bottom of the second touch sensor TS2.

Figure 22:
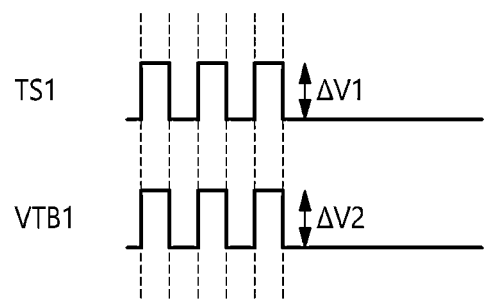
FIG. 22 illustrates driving synchronization between a first sub-touch bridge and a first touch sensor according to embodiments of the present disclosure.

FIG. 22 illustrates driving synchronization between a first sub-touch bridge VTB1 and a first touch sensor TS1.

During the touch period TP, the touch driving circuit 160 may output a touch driving signal TDS whose voltage level is variable to the first touch line TL1.

The touch driving signal TDS applied to the first touch line TL1 may be supplied to the first touch sensor TS1 through a first touch bridge TB1 and a first sub-touch bridge VTB1 electrically connected to the first touch line TL1.

The amplitude ΔV2 of the signal applied to the first sub-touch bridge VTB1 may be the same as an amplitude ΔV1 of the touch driving signal TDS applied to the first touch sensor TS1 or similar within a predefined range.

Accordingly, even if there is a point where the first sub-touch bridge VTB1 or the first touch bridge TB1 slightly overlaps with the first touch sensor TS1, there may not be induced a potential difference. Accordingly, it is possible to prevent or reduce the formation of parasitic capacitance between the first sub-touch bridge VTB1 or the first touch bridge TB1 and the first touch sensor TS1.

Figure 23:
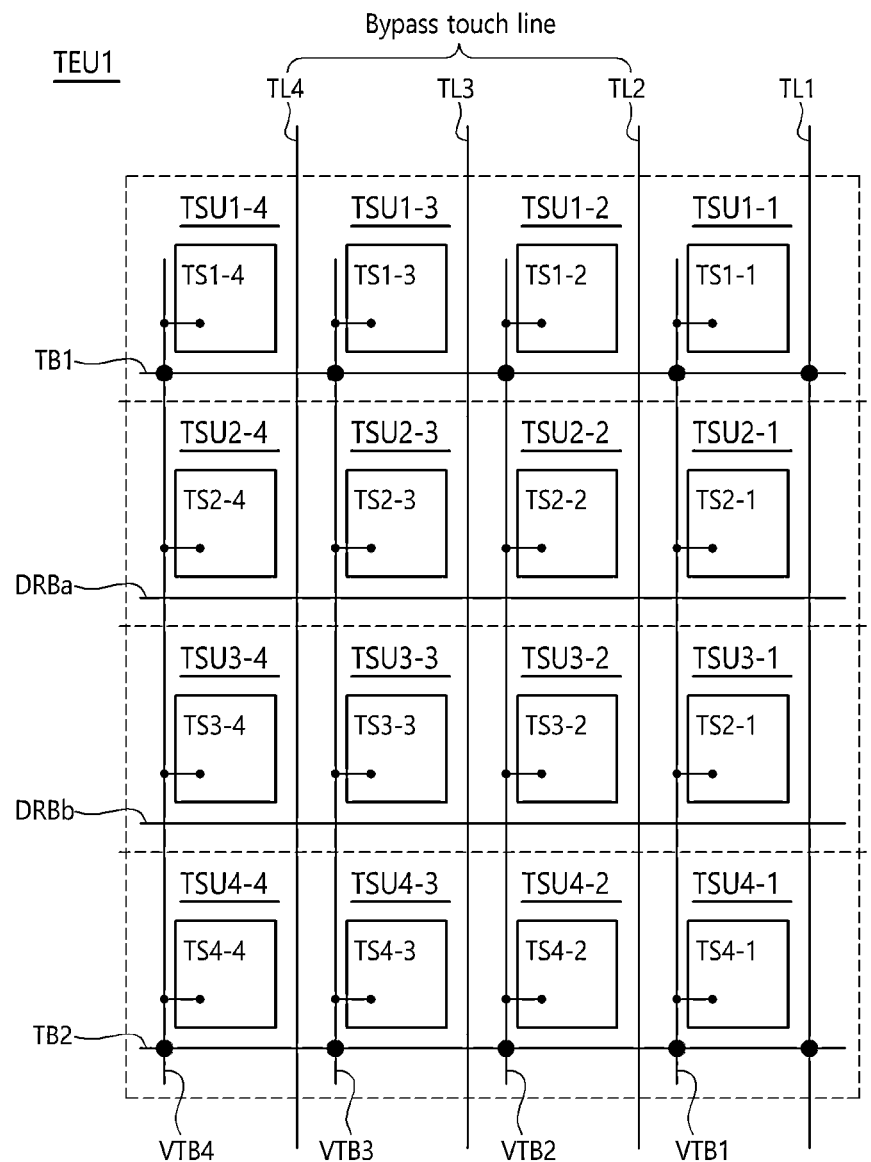
FIG. 23 is a schematic diagram illustrating a first touch electrode unit area to which a plurality of sub-touch bridges are applied according to embodiments of the present disclosure.

FIG. 23 is a plan view schematically illustrating a first touch electrode unit area TEU1 including a plurality of sub-touch bridges VTB1 to VTB4.

However, FIG. 23 illustrates the components driven for touch sensing during the touch period TP. Referring to FIG. 23, the components driven for touch sensing during the touch period TP may include a first touch line TL1, a first touch bridge TB1, a second touch bridge TB2, and touch sensors included in a first touch electrode unit area TEU1.

For example, the first touch electrode unit area TEU1 may include a plurality of touch sensor rows and a plurality of touch sensor columns.

In the example of FIG. 23, the first touch electrode unit area TEU1 may be an area where a first touch sensor TS1 is disposed, and the number of touch sensor rows is four, and the number of touch sensor columns is also four, without being limited thereto. More or less touch sensor rows and touch sensor columns may be possible.

Referring to FIG. 23, for example, the first touch electrode unit area TEU1 may include sixteen touch sensor unit areas TSU1-1, TSU1-2, TSU1-3, TSU1-4, TSU2-1, TSU2-2, TSU2-3, TSU2-4, TSU3-1, TSU3-2, TSU3-3, TSU3-4, TSU4-1, TSU4-2, TSU4-3 and TSU4-4. Here, the sixteen touch sensor unit areas TSU1-1, TSU1-2, TSU1-3, TSU1-4, TSU2-1, TSU2-2, TSU2-3, TSU2-4, TSU3-1, TSU3-2, TSU3-3, TSU3-4, TSU4-1, TSU4-2, TSU4-3 and TSU4-4 may be arranged in four rows and four columns. However, in FIG. 23, sixteen pixel areas included in the sixteen touch sensor unit areas (TSU1-1, TSU1-2, TSU1-3, TSU1-4, TSU2-1, TSU2-2, TSU2-3, TSU2-4, TSU3-1, TSU3-2, TSU3-3, TSU3-4, TSU4-1, TSU4-2, TSU4-3 and TSU4-4 are omitted for convenience of explanation. In addition, in FIG. 23, the sixteen pixel areas included in the sixteen touch sensor unit areas TSU1-1, TSU1-2, TSU1-3, TSU1-4, TSU2-1, TSU2-2, TSU2-3, TSU2-4, TSU3-1, TSU3-2, TSU3-3, TSU3-4, TSU4-1, TSU4-2, TSU4-3 and TSU4-4 are also omitted for convenience of explanation.

For example, the touch sensor unit areas TSU1-1, TSU1-2, TSU1-3, TSU1-4 may be dispose on a first row, the touch sensor unit areas TSU2-1, TSU2-2, TSU2-3, TSU2-4 may be dispose on a second row, the touch sensor unit areas TSU3-1, TSU3-2, TSU3-3, TSU3-4 may be dispose on a third row, and the touch sensor unit areas TSU4-1, TSU4-2, TSU4-3, TSU4-4 may be dispose on a fourth row.

Referring to FIG. 23, sixteen touch sensors TS1-1, TS1-2, TS1-3, TS1-4, TS2-1, TS2-2, TS2-3, TS2-4, TS3-1, TS3-2, TS3-3, TS3-4, TS4-1, TS4-2, TS4-3 and TS4-4 may be respectively disposed in the sixteen touch sensor unit areas TSU1-1, TSU1-2, TSU1-3, TSU1-4, TSU2-1, TSU2-2, TSU2-3, TSU2-4, TSU3-1, TSU3-2, TSU3-3, TSU3-4, TSU4-1, TSU4-2, TSU4-3 and TSU4-4.

Referring to FIG. 23, the sixteen touch sensors TS1-1, TS1-2, TS1-3, TS1-4, TS2-1, TS2-2, TS2-3, TS2-4, TS3-1, TS3-2, TS3-3, TS3-4, TS4-1, TS4-2, TS4-3 and TS4-4 may be electrically connected by the first and second touch bridges TB1 and TB2 and the first to fourth sub-touch bridges VTB1 to VTB4 to form one first touch electrode TE1.

Referring to FIG. 23, a plurality of touch lines TL1, TL2, TL3 and TL4 may pass through the first touch electrode unit area TEU1.

Among the plurality of touch lines TL1, TL2, TL3 and TLA, the first touch line TL1 may be electrically connected to the first touch electrode TE1, and the second to fourth touch lines TL2, TL3 and TL4 may be touch lines which are not electrically connected to the first touch electrode TEL and are bypassed. That is, the first touch line TL1 may be electrically connected to the sixteen touch sensors TS1-1, TS1-2, TS1-3, TS1-4, TS2-1, TS2-2, TS2-3, TS2-4, TS3-1, TS3-2, TS3-3, TS3-4, TS4-1, TS4-2, TS4-3 and TS4-4 which constitute the first touch electrode TE1.

Referring to FIG. 23, in the first touch electrode unit area TEU1, the first sub-touch bridge VTB1 may be disposed to correspond to a first touch sensor row, the second sub-touch bridge VTB2 may be arranged to correspond to a second touch sensor row, the third sub-touch bridge VTB3 may be arranged to correspond to a third touch sensor row, and the fourth sub-touch bridge VTB4 may be arranged to correspond to a fourth touch sensor row.

Referring to FIG. 23, in the first touch electrode unit area TEU1, a first touch bridge TB1 may be arranged to correspond to the first touch sensor row, and a second touch bridge TB2 may be arranged to correspond to the fourth touch sensor row.

Referring to FIG. 23, in the first touch electrode unit area (TEU1), a first dummy touch bridge DTBa may be arranged to correspond to the second touch sensor row, and a second dummy touch bridge DTBb may be arranged to correspond to the third touch sensor row.

Referring to FIG. 23, the first to fourth sub-touch bridges VTB1 to VTB4 may intersect with the first dummy touch bridge DTBa and the second dummy touch bridge DTBb.

However, the first to fourth sub-touch bridges VTB1 to VTB4 may be electrically separated from the first dummy touch bridge DTBa and the second dummy touch bridge DTBb.

According to the embodiments of the present disclosure described above, it is possible to provide a touch display device 100 and a touch sensing method capable of eliminating ghost touch.

Embodiments of the present disclosure described above are briefly described as follows.

A touch display device according to embodiments of the present disclosure may include a first subpixel with a first light emitting device and a first scanning transistor, a first touch sensor adjacent to the first subpixel in a row direction, a first touch line electrically connected to the first touch sensor and extending in a column direction, a first sensing line disposed adjacent to the first touch line and extending in the column direction, a first sensing transistor controlling an electrical connection between the first sensing line and the first touch sensor, a first touch bridge electrically connected to the first touch line and extending in the row direction, and a first sub-touch bridge electrically connected to the first touch bridge and the first touch sensor, extending in the column direction, and disposed between the first subpixel and the first touch sensor.

The touch display device according to embodiments of the present disclosure may further include a first scanning gate line electrically connected to a gate node of the first scanning transistor and a gate node of the first sensing transistor.

In the touch display device according to exemplary embodiments of the present disclosure, when the first scanning transistor is turned on, the first sensing transistor is also turned on, so that the first touch sensor and the first sensing line are electrically connected.

In the touch display device according to exemplary embodiments of the present disclosure, when the first scanning transistor is turned off, the first sensing transistor is also turned off, so that the first touch sensor and the first sensing line are electrically separated.

The touch display device according to embodiments of the present disclosure may further include a second subpixel adjacent to the first subpixel in the column direction, and including a second light emitting device and a second scanning transistor, a second touch sensor adjacent to the second subpixel in the row direction, and a second sensing transistor controlling an electrical connection between the first sensing line and the second touch sensor.

The touch display device according to embodiments of the present disclosure may further include a second scanning gate line electrically connected to a gate node of the second scanning transistor and a gate node of the second sensing transistor.

The touch display device according to embodiments of the present disclosure may further include a dummy touch bridge intersecting the first touch line and the first sub-touch bridge while being electrically separated from the first touch line and the first sub-touch bridge, and disposed parallel to the first touch bridge.

In the touch display device according to embodiments of the present disclosure, the first sub-touch bridge may not overlap with the first touch sensor. Therefore, it is possible to increase the transmittance of the transmission area (also referred to as a transparent area) where the first touch sensor is disposed.

In the touch display device according to exemplary embodiments of the present disclosure, the first sub-touch bridge may not overlap with the first touch sensor except for a portion connected to the first touch sensor.

In the touch display device according to embodiments of the present disclosure, the first sub-touch bridge may not overlap with a first electrode included in the first light emitting device. Accordingly, it is possible to reduce the coupling between a touch bridge structure and the first electrode (e.g., the anode electrode), which can reduce the load and also reduce the display-to-touch crosstalk (DTX).

The touch display device according to embodiments of the present disclosure may further include a substrate, an insulating layer on the substrate, an overcoat layer on the insulating layer, a first electrode disposed on the overcoat layer in a first pixel area including the first subpixel, an organic layer disposed on the first electrode in the first pixel area, and a second electrode disposed on the organic layer in the first pixel area.

The overcoat layer may be not disposed in an area where the first touch sensor is disposed.

The first touch sensor may include the same material as the second electrode.

The touch display device according to embodiments of the present disclosure may further include a separation insulating layer separated from the insulating layer between the first pixel area and the first touch sensor, and a separation overcoat layer separated from the overcoat layer between the first pixel area and the first touch sensor.

The separation overcoat layer may be located on the separation insulating layer.

A lower surface of the separation overcoat layer may have a larger area than an upper surface of the separation insulating layer.

The touch display device according to embodiments of the present disclosure may further include a separation organic layer on the separation overcoat layer, and a separation dummy metal on the separation organic layer.

In an area between the overcoat layer and the separation overcoat layer, the separation organic layer may include the same organic material as the organic layer and may be disconnected from the organic layer, and the separation dummy metal may include the same metal as the second electrode and may be disconnected from the second electrode.

The first sub-touch bridge may be disposed so as not to overlap with the area between the overcoat layer and the separation overcoat layer.

If the first sensing transistor is turned off, a signal having a variable voltage level may be supplied to the first touch line, the first touch bridge, the first sub-touch bridge, and the first touch sensor. In the touch display device according to embodiments of the present disclosure, the first touch sensor may be included in a transmission area that allows light to pass through.

The touch display device according to embodiments of the present disclosure may further include a first display driving line connected to the first subpixel.

The first display driving line may be disposed in the column direction while passing between the first subpixel and the first touch sensor.

The touch display device according to embodiments of the present disclosure may further include an organic layer included in the first light emitting device or disposed on an upper portion or a lower portion of the first light emitting device.

A display period may include a first period in which a first data voltage for displaying an image is supplied to the first subpixel.

During the first period, the first sensing transistor may be turned on together with the first scanning transistor.

During a touch period different from the display period, the first sensing transistor may be turned off.

During the first period, the second sensing transistor may be turned off together with the second scanning transistor.

In the touch display device according to exemplary embodiments of the present disclosure, a display period may further include a second period proceeding after the first period, during the second period, the first sensing transistor may be turned off together with the first scanning transistor, and the second sensing transistor may be turned on together with the second scanning transistor.

During the first period of the display period, the first touch sensor and the first sensing line may be electrically connected, a test signal may be supplied to the first touch line, and current may flow to the first sensing line.

A touch display device according to embodiments of the present disclosure may include a first touch sensor disposed in a transparent area, a first touch line electrically connected to the first touch sensor and extending in a column direction, a first touch bridge electrically connected to the first touch line and extending in a row direction, and a first sub-touch bridge electrically connected to the first touch bridge and the first touch sensor, extending in the column direction, and not overlapping with the first touch sensor.

The touch display device according to embodiments of the present disclosure may further include a substrate, an insulating layer on the substrate, an overcoat layer on the insulating layer, a first electrode disposed on the overcoat layer in a first pixel area including a first subpixel, an organic layer disposed on the first electrode in the first pixel area, and a second electrode disposed on the organic layer in the first pixel area The overcoat layer may be not disposed in an area where the first touch sensor is disposed.

The touch display device according to embodiments of the present disclosure may further include a separation insulating layer separated from the insulating layer between the first pixel area and the first touch sensor, and a separation overcoat layer separated from the overcoat layer between the first pixel area and the first touch sensor.

The separation overcoat layer may be located on the separation insulating layer.

A lower portion of the separation overcoat layer may be larger than an upper portion of the separation insulating layer.

The separation overcoat layer may be located on the separation insulating layer.

A lower or rear surface area of the separation overcoat layer may have a larger area than an upper or top surface of the separation insulating layer.

The first sub-touch bridge may be disposed so as not to overlap with an area between the overcoat layer and the separation overcoat layer.

A touch sensing method according to exemplary embodiments of the present disclosure may include a temperature sensing step for sensing a temperature of an area of a first touch sensor to obtain a temperature sensing value, or sense a current through the first touch sensor to obtain a current sensing value as the temperature sensing value during the display period; a touch sensing step for acquiring a first touch sensing value through the first touch sensor during a touch period; a temperature compensation step for creating a second touch sensing value by changing the first touch sensing value based on the temperature sensing value; and a touch occurrence or touch location determination step for determining the touch occurrence or touch location based on the second touch sensing value.

According to embodiments of the present disclosure, it is possible to provide a touch display device having a touch bridge structure capable of preventing reduction in transmittance.

According to embodiments of the present disclosure, it is possible to provide a touch display device having a touch bridge structure capable of reducing a display-to-touch crosstalk (DTX).

According to embodiments of the present disclosure, it is possible to provide a touch display device having a touch sensor structure capable of reducing parasitic capacitance and load.

According to embodiments of the present disclosure, it is possible to provide a touch display device capable of removing a ghost touch.

According to embodiments of the present disclosure, it is possible to provide a touch display device having a temperature sensor structure combined with a touch sensor structure.

According to embodiments of the present disclosure, it is possible to provide a touch display device capable of compensating a touch sensing value by sensing a current reflecting temperature.

According to embodiments of the present disclosure, it is possible to provide a touch display device having a dummy touch bridge structure capable of preventing specific areas (e.g. specific horizontal areas) within a screen from appearing strangely.

The above description and the accompanying drawings provide an example of the technical idea of the present disclosure for illustrative purposes only. Various modifications, additions and substitutions to the described embodiments will be readily apparent to those skilled in the art without departing from the spirit and scope of the present disclosure. In addition, the disclosed embodiments are intended to illustrate the scope of the technical idea of the present disclosure. Thus, the scope of the present disclosure is not limited to the embodiments shown.

What is claimed is:

1. A touch display device comprising:
   a first subpixel with a first light emitting device and a first scanning transistor;
   a first touch sensor adjacent to the first subpixel in a row direction;
   a first touch line electrically connected to the first touch sensor, the first touch line extending in a column direction;
   a first sensing line adjacent to the first touch line, the first sensing line extending in the column direction;
   a first sensing transistor controlling an electrical connection between the first sensing line and the first touch sensor;
   a first touch bridge electrically connected to the first touch line, the first touch bridge extending in the row direction; and
   a first sub-touch bridge electrically connected to the first touch bridge and the first touch sensor, the first sub-touch bridge extending in the column direction and between the first subpixel and the first touch sensor.

2. The touch display device of claim 1, further comprising:
   a first scanning gate line electrically connected to a gate node of the first scanning transistor and a gate node of the first sensing transistor.

3. The touch display device of claim 1, further comprising:
   a second subpixel adjacent to the first subpixel in the column direction, the second subpixel including a second light emitting device and a second scanning transistor;
   a second touch sensor adjacent to the second subpixel in the row direction; and
   a second sensing transistor controlling an electrical connection between the first sensing line and the second touch sensor.

4. The touch display device of claim 3, further comprising:
   a second scanning gate line electrically connected to a gate node of the second scanning transistor and a gate node of the second sensing transistor.

5. The touch display device of claim 3, further comprising:
   a dummy touch bridge intersecting the first touch line and the first sub-touch bridge while being electrically separated from the first touch line and the first sub-touch bridge, the dummy touch bridge parallel to the first touch bridge.

6. The touch display device of claim 1, wherein the first sub-touch bridge is non-overlapping with the first touch sensor.

7. The touch display device of claim 1, wherein the first sub-touch bridge is non-overlapping with a first electrode included in the first light emitting device.

8. The touch display device of claim 1, further comprising:
a substrate;
an insulating layer on the substrate;
an overcoat layer on the insulating layer,
a first electrode on the overcoat layer in a first pixel area including the first subpixel;
an organic layer on the first electrode in the first pixel area; and
a second electrode on the organic layer in the first pixel area,
wherein the first touch sensor includes a same material as the second electrode,
wherein the overcoat layer is not disposed in an area where the first touch sensor is disposed.

9. The touch display device of claim 8, further comprising:
a separation insulating layer separated from the insulating layer between the first pixel area and the first touch sensor; and
a separation overcoat layer separated from the overcoat layer between the first pixel area and the first touch sensor,
wherein the separation overcoat layer is on the separation insulating layer, and a lower surface of the separation overcoat layer has a larger area than an area of an upper surface of the separation insulating layer.

10. The touch display device of claim 9, further comprising:
a separation organic layer on the separation overcoat layer, and
a separation dummy metal on the separation organic layer,
wherein, in an area between the overcoat layer and the separation overcoat layer, the separation organic layer includes a same organic material as the organic layer and is disconnected from the organic layer,
and the separation dummy metal includes a same metal as the second electrode and is disconnected from the second electrode.

11. The touch display device of claim 9, wherein the first sub-touch bridge is non-overlapping with the area between the overcoat layer and the separation overcoat layer.

12. The touch display device of claim 1, wherein the first touch sensor is included in a transmission area that allows light to pass through the transmission area.

13. The touch display device of claim 1, further comprising:
a first display driving line connected to the first subpixel,
wherein the first display driving line is in the column direction while passing between the first subpixel and the first touch sensor.

14. The touch display device of claim 1, further comprising:
an organic layer included in the first light emitting device or on an upper portion or a lower portion of the first light emitting device.

15. The touch display device of claim 1, wherein a display period includes a first period in which a first data voltage for displaying an image is supplied to the first subpixel,
wherein, during the first period, the first sensing transistor is turned on together with the first scanning transistor,
wherein, during a touch period that is different from the display period, the first sensing transistor is turned off.

16. The touch display device of claim 15, wherein, during the first period of the display period, the first touch sensor and the first sensing line are electrically connected, a test signal is supplied to the first touch line, and current flows to the first sensing line.

17. A touch display device comprising:
a first touch sensor in a transparent area;
a first touch line electrically connected to the first touch sensor, the first touch line extending in a column direction;
a first touch bridge electrically connected to the first touch line, the first touch bridge extending in a row direction; and
a first sub-touch bridge electrically connected to the first touch bridge and the first touch sensor, the first sub-touch bridge extending in the column direction and non-overlapping with the first touch sensor.

18. The touch display device of claim 17, further comprising:
a substrate;
an insulating layer on the substrate;
an overcoat layer on the insulating layer,
a first electrode on the overcoat layer in a first pixel area including a first subpixel;
an organic layer on the first electrode in the first pixel area; and
a second electrode on the organic layer in the first pixel area,
wherein the overcoat layer is not disposed in an area where the first touch sensor is disposed.

19. The touch display device of claim 18, further comprising:
a separation insulating layer separated from the insulating layer between the first pixel area and the first touch sensor; and
a separation overcoat layer separated from the overcoat layer between the first pixel area and the first touch sensor,
wherein the separation overcoat layer is located on the separation insulating layer,
wherein a rear surface area of the separation overcoat layer is larger than an upper surface area of the separation insulating layer.

20. The touch display device of claim 19, wherein the first sub-touch bridge is non-overlapping with an area between the overcoat layer and the separation overcoat layer.

* * * * *